(12) United States Patent
Sakamoto et al.

(10) Patent No.: US 9,264,735 B2
(45) Date of Patent: Feb. 16, 2016

(54) IMAGE ENCODING APPARATUS AND METHOD FOR ALLOWING MOTION VECTOR DETECTION

(75) Inventors: Daisuke Sakamoto, Tokyo (JP); Yushi Kaneko, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 533 days.

(21) Appl. No.: 13/600,466

(22) Filed: Aug. 31, 2012

(65) Prior Publication Data
US 2013/0003853 A1 Jan. 3, 2013

Related U.S. Application Data

(63) Continuation of application No. 11/772,630, filed on Jul. 2, 2007, now Pat. No. 8,270,490.

(30) Foreign Application Priority Data

Jul. 6, 2006 (JP) ................................. 2006-186972
Sep. 29, 2006 (JP) ................................. 2006-269016

(51) Int. Cl.
| | |
|---|---|
| *H04N 11/02* | (2006.01) |
| *H04N 19/57* | (2014.01) |
| *H04N 19/176* | (2014.01) |
| *H04N 19/61* | (2014.01) |
| *H04N 19/107* | (2014.01) |
| *H04N 19/109* | (2014.01) |
| *H04N 19/137* | (2014.01) |

(52) U.S. Cl.
CPC ............. *H04N 19/57* (2014.11); *H04N 19/107* (2014.11); *H04N 19/109* (2014.11); *H04N 19/137* (2014.11); *H04N 19/176* (2014.11); *H04N 19/61* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 6,055,330 A * | 4/2000 | Eleftheriadis et al. | 382/154 |
| 6,909,748 B2 | 6/2005 | Dinerstein | |
| 7,085,424 B2 | 8/2006 | Kajiki et al. | |
| 7,095,786 B1 | 8/2006 | Schonfeld et al. | |
| 7,324,596 B2 | 1/2008 | Gallant et al. | |
| 7,676,101 B2 | 3/2010 | Sato et al. | |
| 7,720,154 B2 | 5/2010 | Zhou et al. | |

(Continued)

FOREIGN PATENT DOCUMENTS

| | | |
|---|---|---|
| JP | 01-183286 A | 7/1989 |
| JP | 08-032969 A | 2/1996 |

(Continued)

*Primary Examiner* — Dave Czekaj
*Assistant Examiner* — Leron Beck
(74) *Attorney, Agent, or Firm* — Carter, DeLuca, Farrell & Schmidt, LLP

(57) ABSTRACT

An apparatus detects a motion vector using image data to be encoded, and a plurality of reference image data. The apparatus conducts a motion vector search for first reference image data using a large block obtained by dividing the image data to be encoded, and divides the large block into a smaller block size at the position of a smallest matching error. The apparatus determines a block size used in a motion vector search for another reference data based on matching errors in the small blocks.

21 Claims, 14 Drawing Sheets

(56) References Cited

U.S. PATENT DOCUMENTS

| | | |
|---|---|---|
| 7,865,019 B2 | 1/2011 | Han et al. |
| 2003/0152150 A1 | 8/2003 | Fujimoto et al. |
| 2006/0002474 A1* | 1/2006 | Au et al. ............ 375/240.16 |
| 2007/0019721 A1 | 1/2007 | Le Leannec et al. |
| 2007/0268964 A1 | 11/2007 | Zhao |
| 2011/0038421 A1 | 2/2011 | Schwarz et al. |

FOREIGN PATENT DOCUMENTS

| | | |
|---|---|---|
| JP | 2002-209219 A | 7/2002 |
| JP | 2003-204548 A | 7/2003 |
| JP | 2003-284091 A | 10/2003 |
| JP | 2004-186897 A | 7/2004 |
| JP | 2005-167720 A | 6/2005 |
| JP | 2005-268879 A | 9/2005 |

* cited by examiner

FIG. 2B
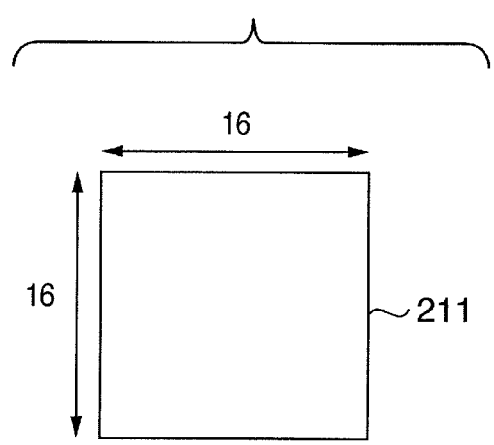
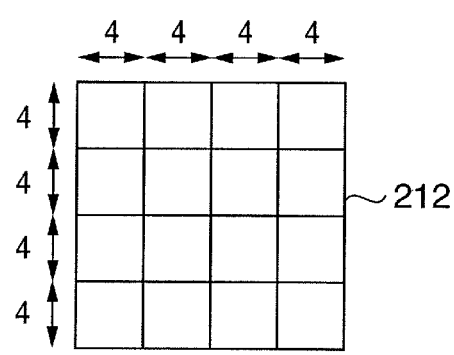

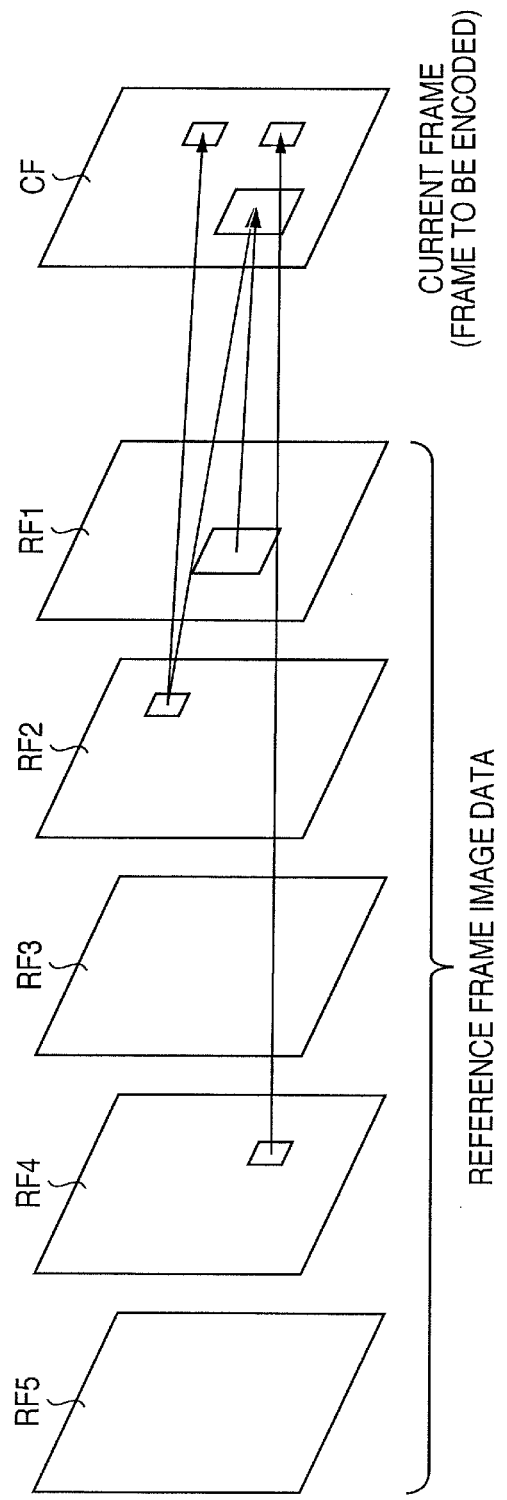

IMAGE ENCODING APPARATUS AND METHOD FOR ALLOWING MOTION VECTOR DETECTION

CROSS REFERENCE TO RELATED APPLICATIONS

This application is a continuation of U.S. patent application Ser. No. 11/772,630, filed Jul. 2, 2007, which claims the benefit of Japanese Patent Application No. 2006-186972 filed Jul. 6, 2006, and Japanese Patent Application No. 2006-269016 filed Sep. 29, 2006, each of which are hereby incorporated by reference herein in their entirety.

BACKGROUND OF THE INVENTION

1. Field of the Invention

The present invention relates to a motion vector detection apparatus, motion vector detection method, image encoding apparatus, image encoding method, and computer program.

2. Description of the Related Art

In recent years, digitization of multimedia-related information has been advancing rapidly, and demand for higher video image quality is increasing accordingly. As a practical example, there is currently an ongoing transition of broadcast media from conventional standard definition (SD) at 720×480 pixels to high definition (HD) at 1920×1080 pixels. However, the demand for higher image quality leads to a concomitant increase in digital data size and creates a need for compression encoding and decoding techniques exceeding the conventional capabilities.

To meet such demands, standardization of a compression encoding scheme using inter-frame prediction that exploits correlation among images has been implemented by the ITU-T SG16 and ISO/IEC JTC1/SC29/WG11.

As compression encoding schemes for moving images, standards such as MPEG-1, 2, and 4 and H.264 are available. In the compression encoding processing for a moving image, an original image (image) included in a moving image is divided into predetermined regions called blocks, and motion-compensated prediction and DCT transformation processing are applied to divided blocks as units.

In the case of motion-compensated prediction, the size of a block used as a unit of compression encoding processing is 16 pixels (horizontal)×16 lines (vertical) (such block is called a macroblock) in the MPEG1 and MPEG2 schemes. Upon applying frame prediction to one macroblock, one motion vector including two components in the horizontal and vertical directions is assigned. Upon applying field prediction, two motion vectors each including two components in the horizontal and vertical directions are assigned.

Upon applying motion-compensated prediction using macroblocks as units like in MPEG1 and MPEG2, motion vector assignment processing adopts a macroblock 601 as a processing unit, as shown in FIG. 6A. Then, all pixels in this macroblock 601 are represented by only one motion vector 602. A motion image is processed based on respective horizontal and vertical motion amounts of this motion vector 602.

The MPEG4 scheme comprises a mode (to be referred to as 8×8 mode hereinafter) that applies motion compensation to blocks (small blocks) 603 each having 8 pixels (horizontal)×8 lines (vertical) as units, as shown in FIG. 6B, in addition to motion-compensated prediction for respective macroblocks. Using this 8×8 mode, when a macroblock 604 of 16 pixels (horizontal) and 16 lines (vertical) includes a plurality of motions, motion vectors closely resembling an actual motion can be obtained as compared to the case of one motion vector assigned to the macroblock 604.

For example, upon examining a case in which a background (tower and sun) remains stationary, and a vehicle is moving to the left, as shown in FIG. 7A, the vehicle and background part have different motions. In such images, when a single macroblock 701 includes a part of the vehicle and background together, as shown in FIG. 7B, the motion prediction efficiency can be improved by assigning a motion vector 702 to the vehicle and a motion vector 703 to the background. Upon dividing into small blocks, since one macroblock includes four small blocks, the number of motion vectors is 1 per small block, and 4 per macroblock.

H.264/MPEG-4 PART10 (AVC) (to be simply referred to as H.264 hereinafter) is an encoding scheme that realizes high-efficiency encoding in the present circumstances. The encoding and decoding specifications of H.264 are disclosed, for example, in Japanese Patent Laid-Open No. 2005-167720.

Among the various techniques introduced by H.264, FIG. 2A depicts one which prepares a plurality of different pixel block partitions used in predictive encoding in order to detect a motion amount in a smaller pixel unit, and reduces the code size by selecting a partition with minimum prediction error. Such a partition is called a macroblock partition.

The macroblock partition will be described in detail below with reference to FIG. 2A. H.264 defines 16×16 pixels as a size used in MPEG2 to be a macroblock type 201 having a maximum block size. Based on this, a macroblock partition to be used in predictive encoding can be selected from a total of four different macroblock partitions including partitions 202 to 204 shown in FIG. 2A. Note that selecting a macroblock partition involves selecting a macroblock size to be used in predictive encoding from 16×16 pixels, 16×8 pixels, 8×16 pixels, and 8×8 pixels.

Furthermore, the macroblock partition 204 with the size of 8×8 pixels shown in FIG. 2A can be divided into smaller sub-macroblocks. In this case, the macroblock 20 can be divided into one of four different types of sub-macroblock partitions using sub-macroblocks having a block size of 4×4 pixels at minimum, as denoted by 205 to 208 in FIG. 2A. In this case, selecting a sub-macroblock partition involves selecting a sub-macroblock size to be used in predictive encoding from 8×8 pixels, 8×4 pixels, 4×8 pixels, and 4×4 pixels.

That is, a macroblock partition to be used in predictive encoding is selected from a total of 19 different types. Of these types, three types are the number of macroblock partitions 201 to 203 in FIG. 2A which cannot be divided into sub-macroblock partitions. The remaining 16 types are the product of the number of macroblocks (=4) which can be divided into the sub-macroblock partitions in the macroblocks 204 in FIG. 2A and the number of sub-macroblock partitions (=4) 205 to 208 in FIG. 2A.

In this way, by applying motion-compensated prediction by dividing each macroblock into smaller sub-macroblocks, motion vectors that fit actual motions can be flexibly expressed. However, since additional information such as vector information and the like is required for each divided sub-macroblock, dividing into sub-macroblocks is not always efficient for encoding. Therefore, it is necessary to encode by selecting combinations of sub-macroblocks with optimal sizes from blocks with various sizes.

In H.264, an intra-frame (intra) prediction mode is available, and the pixel values of a macroblock can be predicted from image information in a frame. This mode can perform prediction using blocks divided into a macroblock having a size of 16 pixels (horizontal)×16 lines (vertical) (block 211) and blocks each having a size of 4 pixels (horizontal)×4 lines (vertical) (blocks 212).

Furthermore, as shown in FIG. 5, H.264 can select reference frames with high encoding efficiency from a plurality of reference frames RF1 to RF5 for respective macroblocks in a frame to be encoded (CF), and can designate frames to be used for respective blocks. Hence, even macroblocks in the identical frame CF to be encoded may select different reference frames. In this manner, H.264 sets a plurality of search layers for motion vector detection using a plurality of reference frames.

As a result, motion information is searched for using a smaller image unit, thus improving the motion information precision.

However, MPEG2 has only one type of macroblock, while H.264 has 19 types of partitions. Therefore, intensive arithmetic operations are required to evaluate motion vectors for all blocks included in each partition and to select a combination of optimal block sizes from sub-macroblocks with varying sizes. For this reason, encoding apparatuses are required to have a larger hardware scale and must perform processing using high-speed clocks, which frustrates reductions in apparatus size and power consumption. Since H.264 can perform motion vector detection using a plurality of search layers (a plurality of reference frames), intensive arithmetic operations are required if all the partitions are to be evaluated for respective search layers.

In the case of mobile devices such as video camcorders and the like, an increase in arithmetic load leads to an increase in the amount of battery consumption necessary to drive the device, which results in a shorter recording time periods.

SUMMARY OF THE INVENTION

An embodiment of the present invention is provided to allow motion vector detection by making a motion search using a plurality of block sizes.

According to an aspect of the present invention, an embodiment is directed to an apparatus operable to detect a motion vector using image data to be encoded and a plurality of reference image data. The apparatus comprises a motion vector detection unit configured to determine second image data corresponding to a first block size in first reference image data of the plurality of reference image data, which has a smallest first matching error with first image data corresponding to the first block size in the image data to be encoded, and to detect a first motion vector based on the first image data and the second image data, a first extraction unit configured to divide the first image data into a plurality of third image data corresponding to a second block size smaller than the first block size, and to extract a plurality of second matching errors corresponding to the plurality of third image data from the first matching error, and a first determination unit configured to determine a third block size used in detection of a motion vector using the plurality of reference image data, based on the plurality of second matching errors extracted by the first extraction unit.

According to another aspect of the present invention, an embodiment is directed to an apparatus operable to encode frame data, which form a moving image, using a plurality of reference image data. The apparatus comprises an input unit configured to input a frame to be encoded for each macroblock, a calculation unit configured to calculate a difference between a macroblock to be encoded in the frame to be encoded, and a macroblock, which corresponds to the macroblock to be encoded, in a frame temporally before the frame to be encoded, a determination unit configured to determine a unit of encoding for the macroblock to be encoded based on the difference calculated by the calculation unit, and an encoder configured to encode the macroblock to be encoded by generating a motion vector by selecting one of the plurality of reference images for the unit of encoding determined by the determination unit.

Further features of the present invention will become apparent from the following description of exemplary embodiments with reference to the attached drawings.

BRIEF DESCRIPTION OF THE DRAWINGS

FIG. 2B is a view for explaining macroblocks in an intra prediction mode;

FIG. 5 is a view for explaining the concept for detecting motion information from a plurality of reference frames;

DESCRIPTION OF THE EMBODIMENTS

Embodiments of the present invention will be described hereinafter with reference to the accompanying drawings.

First Embodiment

Figure 1A:
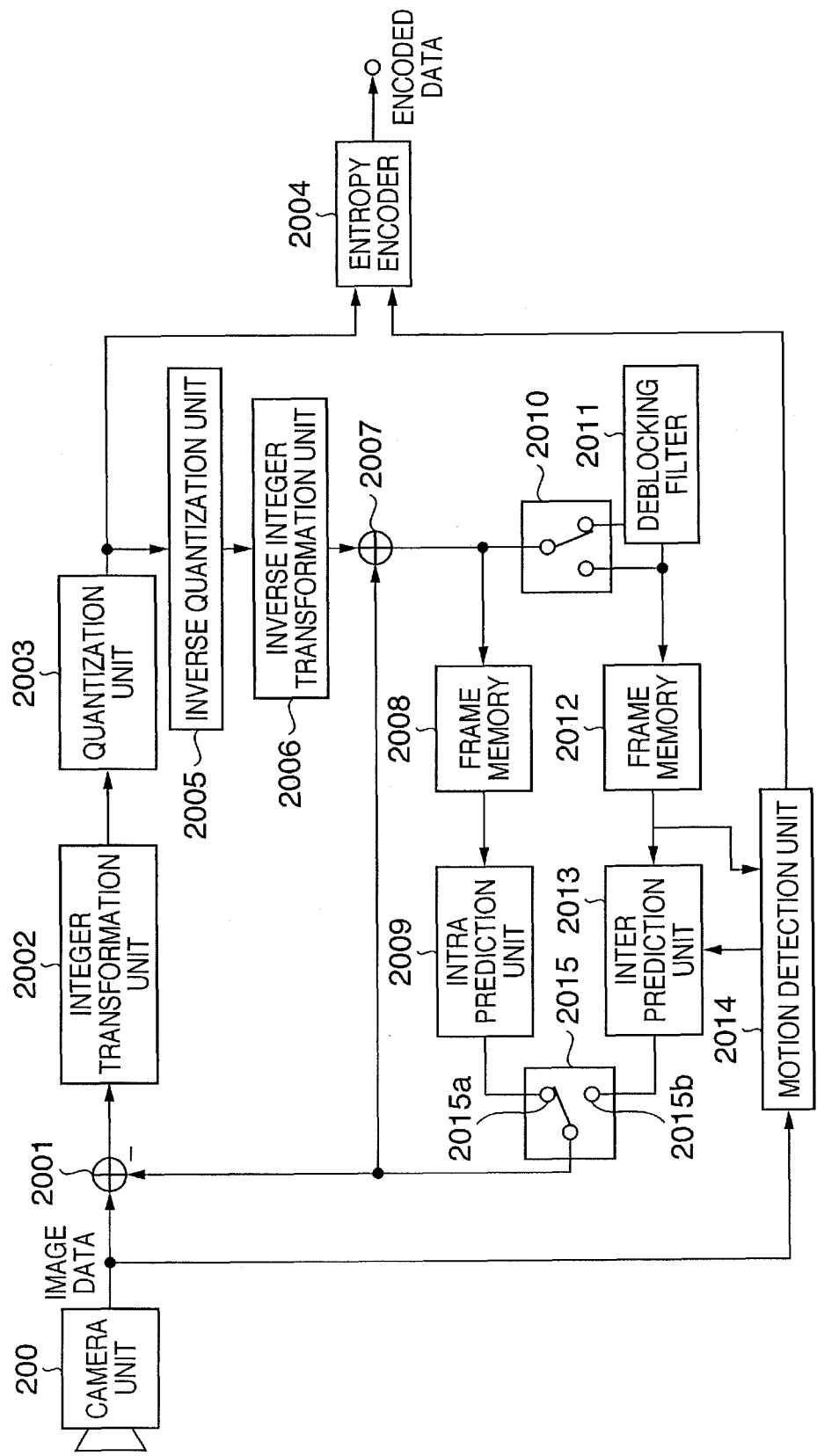
FIG. 1A is a block diagram showing an example of the overall arrangement of an image processing apparatus according to the first embodiment of the present invention.

FIG. 1A is a block diagram showing an example of the overall arrangement of an image compression encoding apparatus as an image processing apparatus according to the first embodiment of the present invention.

This moving image compression encoding apparatus has a camera unit 200, subtractor 2001, integer transformation unit 2002, quantization unit 2003, entropy encoder 2004, inverse quantization unit 2005, inverse integer transformation unit 2006, and an adder 2007. Also, the apparatus further has frame memories 2008 and 2012, an intra prediction unit 2009, switches 2010 and 2015, a deblocking filter 2011, an inter prediction unit 2013, and a motion detection unit 2014. The apparatus forms blocks by dividing image data input from the camera unit 200, and executes encoding processing for respective blocks, thus outputting encoded data. H.264 encoding processing will be described below.

The subtractor 2001 subtracts predicted image data from image data input from the camera unit and outputs residual image error data. Generation of the predicted image data will be described later. The integer transformation unit 2002 executes orthogonal transformation processing of the residual image error data output from the subtractor 2001 by DCT transformation or the like, and outputs transformation coefficients. The quantization unit 2003 quantizes the transformation coefficients using predetermined quantization parameters. The entropy encoder 2004 receives the transformation coefficients quantized by the quantization unit 2003, and entropy-encodes them, thus outputting encoded data.

Moreover, the transformation coefficients quantized by the quantization unit 2003 are also used in generation of the predicted image data. The inverse quantization unit 2005 inverse-quantizes the transformation coefficients quantized by the quantization unit 2003. Furthermore, the inverse integer transformation unit 2006 executes inverse integer transformation processing of the transformation coefficients inverse-quantized by the inverse-quantization unit 2005 by inverse DCT transformation or the like, and outputs decoded residual image error data. The adder 2007 adds the decoded residual image error data and predicted image data, and outputs reconstructed image data.

The reconstructed image data is stored in the frame memory 2008. However, when applying deblocking filter processing, the image data is recorded via the deblocking filter 2011. Moreover, when skipping the deblocking filter processing, the image data is recorded in the frame memory 2012 without going through the deblocking filter 2011. The switch 2010 serves as a selection unit that selects whether or not to apply the deblocking filter processing. Data which is likely to be referred to in subsequent prediction in the reconstructed image data is saved in the frame memory 2008 or 2012 as reference frame data for a certain period. The deblocking filter 2011 is used to remove noise.

The intra prediction unit 2009 executes intra-frame prediction processing using image data recorded in the frame memory 2008 to generate predicted image data. The inter prediction unit 2013 executes inter-frame prediction processing based on motion vector information detected by the motion detection unit 2014 in order to generate predicted image data. The motion detection unit 2014 detects motion vectors in the input image data using the reference image data recorded in the frame memory 2012, and outputs the detected motion vector information to the inter prediction unit 2013 and entropy encoder 2004. The switch 2015 is a selection unit that selects which of intra prediction (a terminal 2015*a*) or inter prediction (a terminal 2015*b*) is to be used. The switch 2015 selects one of the outputs from the intra prediction unit 2009 and inter prediction unit 2013, and outputs the selected predicted image data to the subtractor 2001 and adder 2007.

Figure 1B:
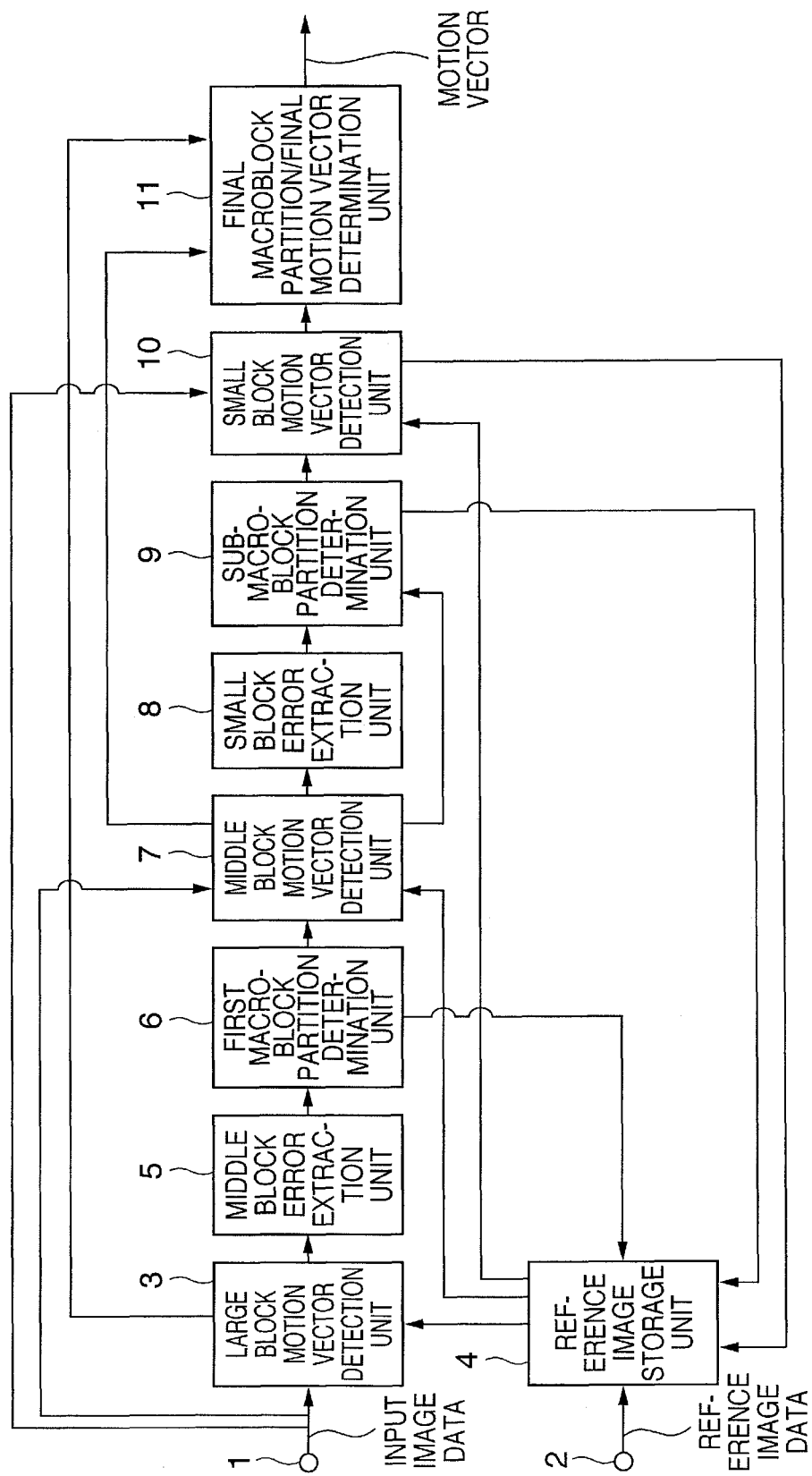
FIG. 1B is a block diagram showing an example of the arrangement of a motion vector detection apparatus according to the first embodiment of the present invention.
Figure 3A:
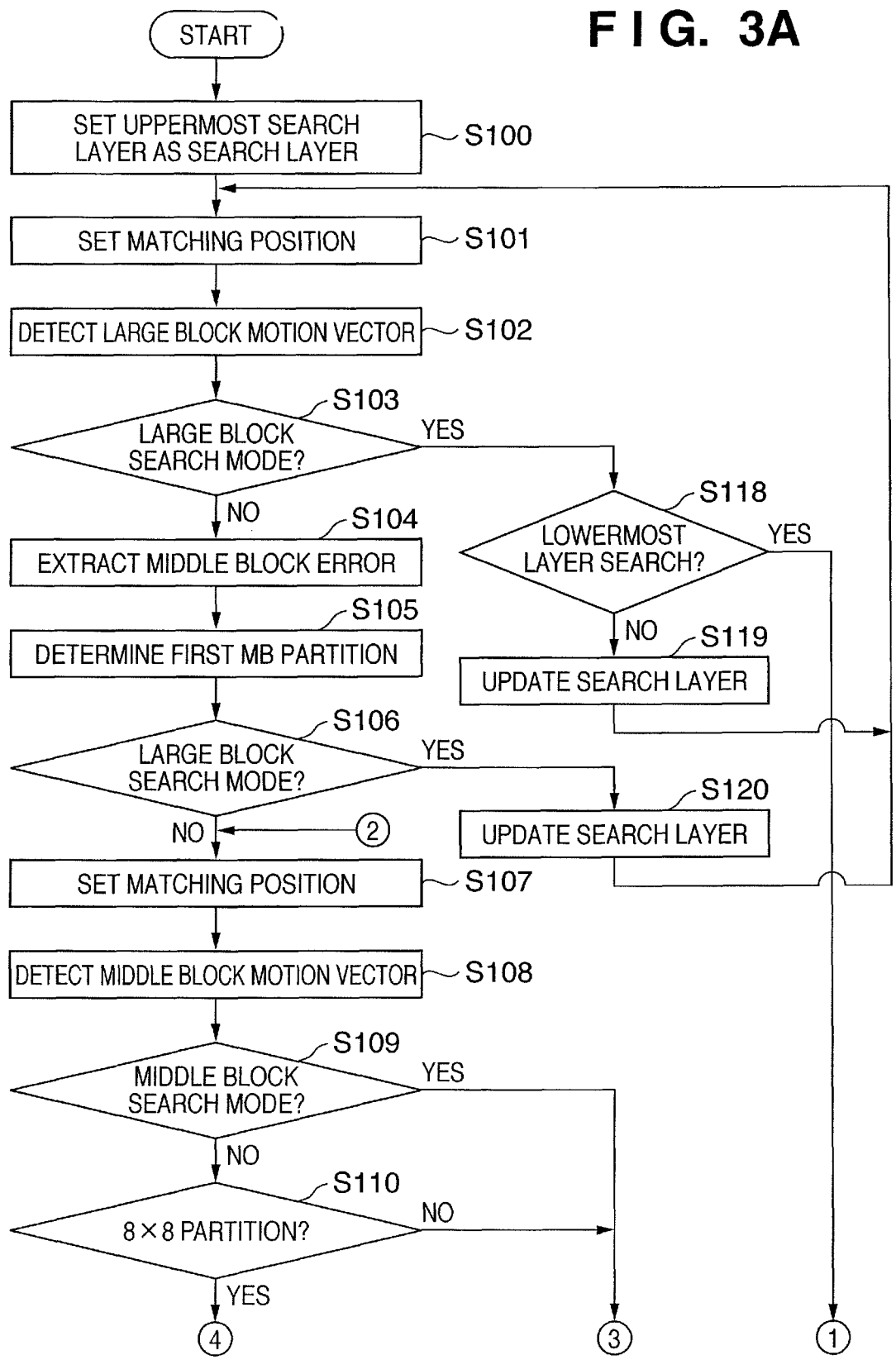
FIGS. 3A and 3B are flowcharts showing an example of processing for detecting motion vectors in one macroblock in input image data item and determining macroblock partitions in a motion detection unit according to the first embodiment of the present invention.
Figure 3B:
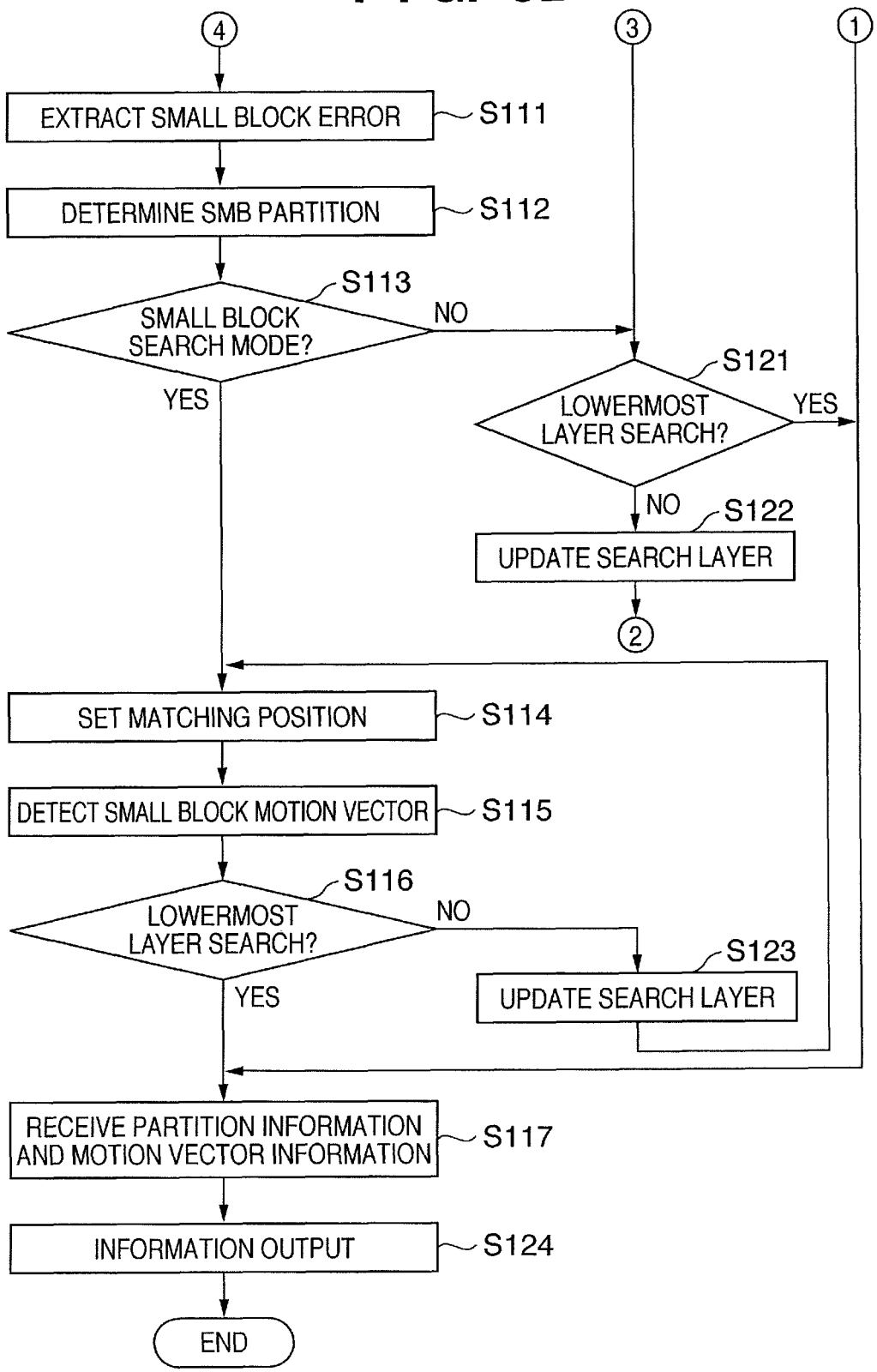

The practical arrangement and operation of the motion detection unit as the motion vector detection apparatus according to this embodiment will be described below. FIG. 1B is a block diagram showing an example of the practical arrangement of the motion detection unit according to this embodiment. FIGS. 3A and 3B are flowcharts showing an example of processing for detecting motion vectors for one macroblock in input image data, and determining macroblock partitions in the motion detection unit according to this embodiment. Note that the following description will be given taking H.264 as an example in this embodiment. However, the present invention may be applied to other encoding schemes.

Input image data as an image signal which is to undergo motion vector detection (image signal to be encoded) is input from the camera unit 200 to a large block motion vector detection unit 3 via an input terminal 1. An image signal, which has already been encoded and locally decoded, is input from the frame memory 2012 via an input terminal 2, and is stored in a reference image storage unit 4.

In step S100, an uppermost layer is set as a search layer. In this embodiment, assume that motion vector detection is performed for a plurality of search layers; that is, a plurality of reference frames, and the reference frame encoded immediately before the input image data is defined as an "uppermost search layer". Also, the reference frame having an oldest encoding timing is defined as a "lowermost search layer". Upon updating search layers, they are updated in the order of encoding timings from the "uppermost search layer" to the "lowermost search layer". For example, in the case of FIG. 5, RF1 corresponds to the "uppermost search layer", and RF5 corresponds to the "lowermost search layer". Upon updating the search layers, they are updated in the order of RF1, RF2, RF3, RF4, and RF5. Note that FIG. 5 illustrates five search layers according to the H.264 standard. However, the number of search layers here is merely an example, and is not limited to this.

In step S101, processing to set the matching position is executed. Setting the matching position refers to the determination of the position of reference image data in the reference frame (search data) in the input image data as a frame to be encoded. If a motion vector between the reference frame and input image data in the previous search layers has not been detected yet, "zero" is set as an initial motion vector to set the matching position in the same block position as that in the input image data. In this case, a large block search mode is set to OFF. In the large block search mode, a search using macroblocks (large blocks) with a size of 16×16 pixels is conducted throughout the lower search layers. If this large block search mode is ON, a subsequent search using middle or small blocks is not conducted. On the other hand, if motion vectors have been detected in upper search layers, and the large block search mode is ON, that motion vector is designated as an initial motion vector and the matching position is set.

Next, in step S102 the large block motion vector detection unit 3 calculates a matching error MAEbig. This matching error MAEbig is calculated between a macroblock (large block) with a size of 16×16 pixels in the input image data from input terminal 1, and reference image data of a large block input from reference image storage unit 4. The matching error can be calculated by calculating differences between the pixel values of two blocks to be compared. The matching error MAEbig is calculated for each search layer, and finally, the motion vector which minimizes the matching error MAEbig within the search range (all the search layers) along with the corresponding matching error at that time is determined. This motion vector will be referred to as a "final motion vector" hereinafter.

In step S103, it is determined whether the large block search mode is ON. If the large block search mode is ON ("YES" in step S103), the process advances to step S118. In step S118, it is determined whether the current search layer is the lowermost search layer. If it is determined that the current search layer is the lowermost search layer ("YES" in step S118), the process jumps to step S117. In step S117, a final macroblock partition/final motion vector determination unit 11 receives, from the large block motion vector detection unit 3, information indicating that a macroblock partition is a large block and the final motion vector. On the other hand, if it is determined that the search layer is not the lowermost search layer ("NO" in step S118), the process advances to step S119 to update the search layer by one, and the process from step S101 continues with the next lowest search layer.

On the other hand, if the large block search mode is OFF ("NO" in step S103), the process advances to step S104. In step S104, the motion vector and matching error MAEbig calculated in step S102 are transmitted to a middle block error extraction unit 5.

Figure 4A:
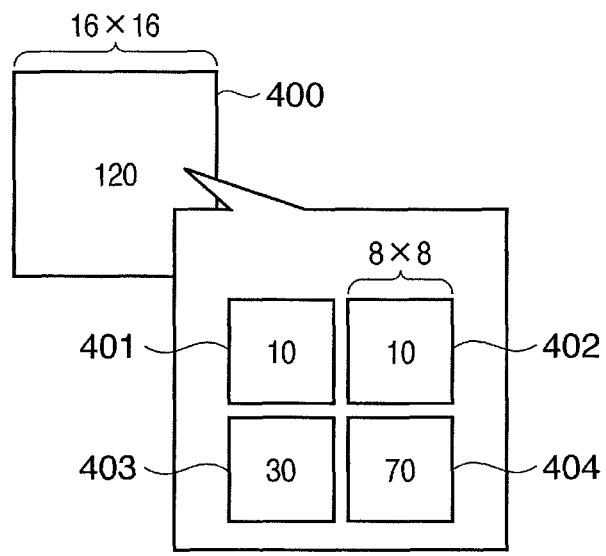
FIG. 4A is a view for explaining the breakdown of matching errors in large and middle blocks according to the first embodiment of the present invention.

The middle block error extraction unit 5 divides a large block 400 into macroblocks 401 to 404 each having a size of 8×8 pixels (to be referred to as middle blocks hereinafter), as shown in FIG. 4A, and extracts matching errors of respective middle blocks. Assume that the matching errors to be extracted are MAEmid(0) for the middle block 401, MAEmid(1) for the middle block 402, MAEmid(2) for the middle block 403, and MAEmid(3) for the middle block 404. The extracted matching errors are transmitted to a first macroblock partition determination unit 6. Note that FIG. 4A shows an example in which when the matching error MAEbig of the large block 400 is 120, the matching errors of the respective middle blocks are MAEmid(0)=10, MAEmid(1)=10, MAEmid(2)=30, and MAEmid(3)=70.

Figure 2A:
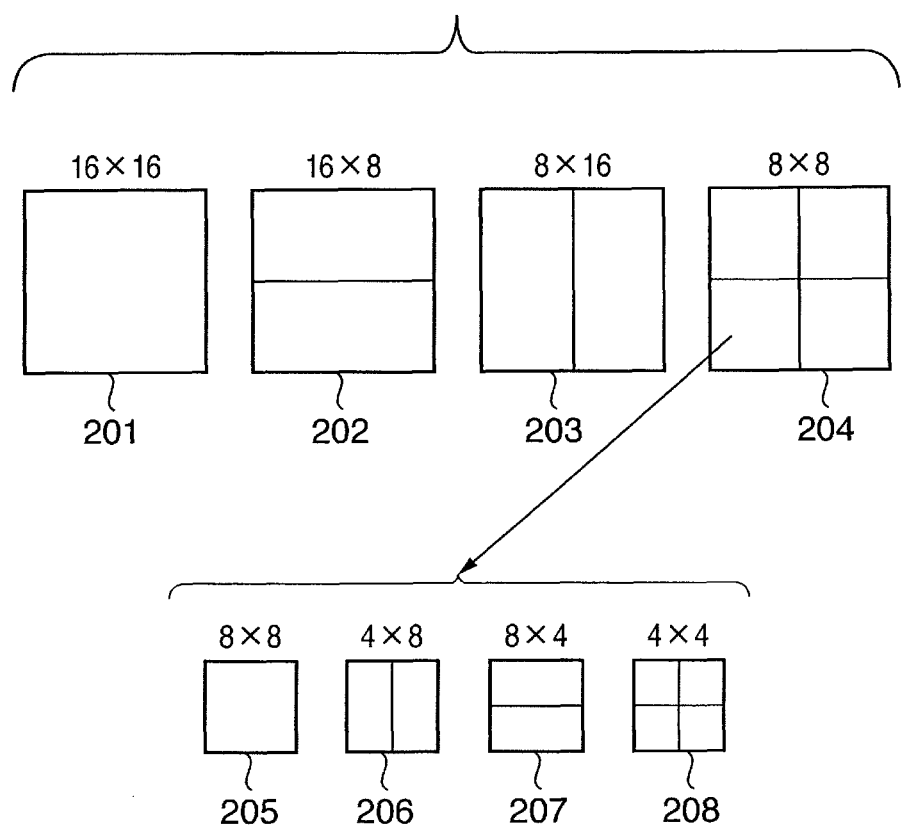
FIG. 2A shows an example of block sizes used in motion vector detection.

In step S105, the first macroblock (MB) partition determination unit 6 compares the matching errors of the respective middle blocks in the current search layer with thresholds, and determines a macroblock partition under the following conditions. In this case, one of the macroblock partitions 201 to 204 shown in FIG. 2A is selected. That is, one of block sizes of 16×16 pixels, 16×8 pixels, 8×16 pixels, and 8×8 pixels is selected. Note that thresholds Thl and Thm meet Thl<Thm.

(Condition 1)
If MAEmid(0)<Thl, MAEmid(1)<Thl, MAEmid(2)<Thl, and MAEmid(3)<Thl,
the macroblock partition 201 in FIG. 2A is selected.

(Condition 2)
If MAEmid(0)<Thl, MAEmid(1)<Thl, MAEmid(2)<Thl, and MAEmid(3)≥Thl:
if MAEmid(1)+MAEmid(3)<Thm and MAEmid(2)+MAEmid(3)<Thm,
the macroblock partitions 202 and 203 are selected;
if MAEmid(1)+MAEmid(3)<Thm and MAEmid(2)+MAEmid(3)≥Thm,
the macroblock partition 203 is selected;
if MAEmid(1)+MAEmid(3)≥Thm and MAEmid(2)+MAEmid(3)<Thm,
the macroblock partition 202 is selected; or
if MAEmid(1)+MAEmid(3)≥Thm and MAEmid(2)+MAEmid(3)≥Thm,
the macroblock partition 204 is selected.

(Condition 3)
If MAEmid(0)<Thl, MAEmid(1)<Thl, MAEmid(2)≥Thl, and MAEmid(3)<Thl:
if MAEmid(0)+MAEmid(2)<Thm and MAEmid(2)+MAEmid(3)<Thm,
the macroblock partitions 202 and 203 are selected;
if MAEmid(0)+MAEmid(2)<Thm and MAEmid(2)+MAEmid(3)≥Thm,
the macroblock partition 203 is selected;
if MAEmid(0)+MAEmid(2)≥Thm and MAEmid(2)+MAEmid(3)<Thm,
the macroblock partition 202 is selected; or
if MAEmid(0)+MAEmid(2)≥Thm and MAEmid(2)+MAEmid(3)≥Thm,
the macroblock partition 204 is selected.

(Condition 4)
If MAEmid(0)<Thl, MAEmid(1)<Thl, MAEmid(2)≥Thl, and MAEmid(3)≥Thl,
the macroblock partition 202 is selected.

(Condition 5)
If MAEmid(0)<Thl, MAEmid(1)≥Thl, MAEmid(2)<Thl, and MAEmid(3)<Thl:
if MAEmid(1)+MAEmid(0)<Thm and MAEmid(1)+MAEmid(3)<Thm,
the macroblock partitions 202 and 203 are selected;
if MAEmid(1)+MAEmid(0)<Thm and MAEmid(1)+MAEmid(3)≥Thm,
the macroblock partition 202 is selected;
if MAEmid(1)+MAEmid(0)≥Thm and MAEmid(1)+MAEmid(3)<Thm,
the macroblock partition 203 is selected; or
if MAEmid(1)+MAEmid(0)≥Thm and MAEmid(1)+MAEmid(3)≥Thm,
the macroblock partition 204 is selected.

(Condition 6)
If MAEmid(0)<Thl, MAEmid(1)≥Thl, MAEmid(2)<Thl, and MAEmid(3)≥Thl,
the macroblock partition 203 is selected.

(Condition 7)
If MAEmid(0)<Thl, MAEmid(1)≥Thl, MAEmid(2)≥Thl, and MAEmid(3)<Thl:
if MAEmid(1)+MAEmid(0)<Thm, MAEmid(0)+MAEmid(2)<Thm, MAEmid(1)+MAEmid(3)<Thm, and MAEmid(2)+MAEmid(3)<Thm,
the macroblock partitions 202 and 203 are selected;
if MAEmid(1)+MAEmid(0)<Thm, MAEmid(0)+MAEmid(2)≥Thm, MAEmid(1)+MAEmid(3)<Thm, and MAEmid(2)+MAEmid(3)≥Thm,
the macroblock partition 202 is selected;
if MAEmid(1)+MAEmid(0)≥Thm, MAEmid(0)+MAEmid(2)<Thm, MAEmid(1)+MAEmid(3)<Thm, and MAEmid(2)+MAEmid(3)≥Thm,
the macroblock partition 203 is selected; or otherwise,
the macroblock partition 204 is selected.

(Condition 8)
If MAEmid(0)<Thl, MAEmid(1)≥Thl, MAEmid(2)≥Thl, and MAEmid(3)≥Thl:
if MAEmid(1)+MAEmid(0)<Thm, MAEmid(0)+MAEmid(2)<Thm, MAEmid(1)+MAEmid(3)<Thm, and MAEmid(2)+MAEmid(3)<Thm,
the macroblock partitions 202 and 203 are selected;
if MAEmid(1)+MAEmid(0)<Thm, MAEmid(0)+MAEmid(2)≥Thm, MAEmid(1)+MAEmid(3)<Thm, and MAEmid(2)+MAEmid(3)≥Thm,
the macroblock partition 202 is selected;
if MAEmid(1)+MAEmid(0)≥Thm, MAEmid(0)+MAEmid(2)<Thm, MAEmid(1)+MAEmid(3)<Thm, and MAEmid(2)+MAEmid(3)≥Thm,
the macroblock partition 203 is selected; or otherwise,
the macroblock partition 204 is selected.

(Condition 9)
If MAEmid(0)≥Thl, MAEmid(1)<Thl, MAEmid(2)<Thl, and MAEmid(3)<Thl:
if MAEmid(0)+MAEmid(1)<Thm and MAEmid(0)+MAEmid(2)<Thm,
the macroblock partitions 202 and 203 are selected;
if MAEmid(0)+MAEmid(1)<Thm and MAEmid(0)+MAEmid(2)≥Thm,
the macroblock partition 202 is selected;
if MAEmid(0)+MAEmid(1)≥Thm and MAEmid(0)+MAEmid(2)<Thm, the macroblock partition 203 is selected; or
if MAEmid(0)+MAEmid(1)≥Thm and MAEmid(0)+MAEmid(2)≥Thm,
 the macroblock partition 204 is selected.
(Condition 10)
If MAEmid(0)≥Thl, MAEmid(1)<Thl, MAEmid(2)<Thl, and MAEmid(3)≥Thl:
 if MAEmid(1)+MAEmid(0)<Thm, MAEmid(0)+MAEmid(2)<Thm, MAEmid(1)+MAEmid(3)<Thm, and MAEmid(2)+MAEmid(3)<Thm,
  the macroblock partitions 202 and 203 are selected;
 if MAEmid(1)+MAEmid(0)<Thm, MAEmid(0)+MAEmid(2)≥Thm, MAEmid(1)+MAEmid(3)<Thm, and MAEmid(2)+MAEmid(3)≥Thm,
  the macroblock partition 202 is selected;
 if MAEmid(1)+MAEmid(0)≥Thm, MAEmid(0)+MAEmid(2)<Thm, MAEmid(1)+MAEmid(3)<Thm, and MAEmid(2)+MAEmid(3)≥Thm,
  the macroblock partition 203 is selected; or otherwise,
  the macroblock partition 204 is selected.
(Condition 11)
If MAEmid(0)≥Thl, MAEmid(1)<Thl, MAEmid(2)≥Thl, and MAEmid(3)<Thl,
 the macroblock partition 202 is selected.
(Condition 12)
If MAEmid(0)≥Thl, MAEmid(1)<Thl, MAEmid(2)≥Thl, and MAEmid(3)≥Thl:
 if MAEmid(1)+MAEmid(0)<Thm, MAEmid(0)+MAEmid(2)<Thm, MAEmid(1)+MAEmid(3)<Thm, and MAEmid(2)+MAEmid(3)<Thm,
  the macroblock partitions 202 and 203 are selected;
 if MAEmid(1)+MAEmid(0)<Thm, MAEmid(0)+MAEmid(2)≥Thm, MAEmid(1)+MAEmid(3)<Thm, and MAEmid(2)+MAEmid(3)≥Thm,
  the macroblock partition 202 is selected;
 if MAEmid(1)+MAEmid(0)≥Thm, MAEmid(0)+MAEmid(2)<Thm, MAEmid(1)+MAEmid(3)<Thm, and MAEmid(2)+MAEmid(3)≥Thm,
  the macroblock partition 203 is selected; or otherwise,
  the macroblock partition 204 is selected.
(Condition 13)
If MAEmid(0)≥Thl, MAEmid(1)≥Thl, MAEmid(2)<Thl, and MAEmid(3)<Thl,
 the macroblock partition 202 is selected.
(Condition 14)
If MAEmid(0)≥Thl, MAEmid(1)≥Thl, MAEmid(2)<Thl, and MAEmid(3)≥Thl:
 if MAEmid(1)+MAEmid(0)<Thm, MAEmid(0)+MAEmid(2)<Thm, MAEmid(1)+MAEmid(3)<Thm, and MAEmid(2)+MAEmid(3)<Thm,
  the macroblock partitions 202 and 203 are selected;
 if MAEmid(1)+MAEmid(0)<Thm, MAEmid(0)+MAEmid(2)≥Thm, MAEmid(1)+MAEmid(3)<Thm, and MAEmid(2)+MAEmid(3)≥Thm,
  the macroblock partition 202 is selected;
 if MAEmid(1)+MAEmid(0)≥Thm, MAEmid(0)+MAEmid(2)<Thm, MAEmid(1)+MAEmid(3)<Thm, and MAEmid(2)+MAEmid(3)≥Thm,
  the macroblock partition 203 is selected; or otherwise,
  the macroblock partition 204 is selected.
(Condition 15)
If MAEmid(0)≥Thl, MAEmid(1)≥Thl, MAEmid(2)≥Thl, and MAEmid(3)<Thl:
 if MAEmid(1)+MAEmid(0)<Thm, MAEmid(0)+MAEmid(2)<Thm, MAEmid(1)+MAEmid(3)<Thm, and MAEmid(2)+MAEmid(3)<Thm,
  the macroblock partitions 202 and 203 are selected;
 if MAEmid(1)+MAEmid(0)<Thm, MAEmid(0)+MAEmid(2)≥Thm, MAEmid(1)+MAEmid(3)<Thm, and MAEmid(2)+MAEmid(3)≥Thm,
  the macroblock partition 202 is selected;
 if MAEmid(1)+MAEmid(0)≥Thm, MAEmid(0)+MAEmid(2)<Thm, MAEmid(1)+MAEmid(3)<Thm, and MAEmid(2)+MAEmid(3)≥Thm,
  the macroblock partition 203 is selected; or otherwise,
  the macroblock partition 204 is selected.
(Condition 16)
If MAEmid(0)≥Thl, MAEmid(1)≥Thl, MAEmid(2)≥Thl, and MAEmid(3)≥Thl:
 if MAEmid(1)+MAEmid(0)<Thm, MAEmid(0)+MAEmid(2)<Thm, MAEmid(1)+MAEmid(3)<Thm, and MAEmid(2)+MAEmid(3)<Thm,
  the macroblock partitions 202 and 203 are selected;
 if MAEmid(1)+MAEmid(0)<Thm, MAEmid(0)+MAEmid(2)≥Thm, MAEmid(1)+MAEmid(3)<Thm, and MAEmid(2)+MAEmid(3)≥Thm,
  the macroblock partition 202 is selected;
 if MAEmid(1)+MAEmid(0)≥Thm, MAEmid(0)+MAEmid(2)<Thm, MAEmid(1)+MAEmid(3)<Thm, and MAEmid(2)+MAEmid(3)≥Thm,
  the macroblock partition 203 is selected; or otherwise,
  the macroblock partition 204 is selected.

If, for example, Thl=15 and Thm=40, in the example of FIG. 4A, (Condition 4) above is applied, and the macroblock partition 202 is selected. Note that if the macroblock partition 201 is selected, the large block search mode is set to ON. If the macroblock partition other than the macroblock partition 201 is selected, the setting of the large block search mode is kept OFF.

In step S106, it is determined whether the large block search mode is ON. As described above, if the type denoted by 201 in FIG. 2A is selected as the macroblock partition in step S105, the large block search mode is set to ON. If it is determined that the large block search mode is ON ("YES" in step S106), the process advances to step S120 to update the search layer by one, and the process then returns to step S101. In step S101, a new matching position is set using the motion vector already calculated by the large block motion vector detection unit 3 in step S102, and a search using a large block is repeated until reaching the lowermost layer.

By limiting the macroblock partition used in searching the lower layers, arithmetic processing can be greatly reduced compared to search using all macroblock partitions.

On the other hand, if it is determined that the large block search mode is OFF ("NO" in step S106), the process advances to step S107. In step S107, a middle block motion vector detection unit 7 acquires the macroblock partition and motion vector from the first macroblock partition determination unit 6, and determines a matching position using that motion vector.

In step S108, matching errors MAEmid with reference image data input from the reference image storage unit 4 for respective blocks are calculated using the acquired macroblock partition. The matching errors MAEmid are calculated for each search layer, and finally, the motion vector which minimizes the matching error MAEmid within the search range (all the search layers) along with the corresponding matching error at that time is determined. This motion vector will be referred to as a "final motion vector" hereinafter. At this time, if a macroblock partition other than the macroblock partition 204 is selected, a middle block search mode is set to ON. On the other hand, if the macroblock partition 204 is selected, the middle block search mode is set to OFF.

In step S109, it is determined whether or not the middle block search mode is ON. The middle block search mode is a mode for conducting a search using "middle blocks" throughout lower search layers. If this middle block search mode is ON, a subsequent search using large or small blocks is not conducted.

If it is determined in step S109 that the middle block search mode is ON ("YES" in step S109), the process advances to step S121. In step S121, it is determined whether or not the current search layer is the lowermost search layer. If it is determined that the current search layer is the lowermost search layer ("YES" in step S121), the process jumps to step S117. In step S117, the final macroblock partition/final motion vector determination unit 11 receives, from the middle block motion vector detection unit 7, information indicating the macroblock partition at that time as well as the final motion vector. On the other hand, if it is determined that the search layer is not the lowermost search layer ("NO" in step S121), the process advances to step S122 to update the search layer by one, and the process from step S107 continues with the next lowest search layer.

In this way, by limiting the macroblock partition used in a search in the lower layers, arithmetic processing can be greatly reduced compared to a search using all the macroblock partitions.

If it is determined in step S109 that the middle block search mode is OFF ("NO" in step S109), the process advances to step S110. In step S110, it is determined if the macroblock partition used in the middle block error extraction unit 5 is the macroblock partition 204. If it is determined that the macroblock partition used is not the macroblock partition 204 ("NO" in step S110), the process advances to step S121 to execute the aforementioned process. On the other hand, if it is determined that the macroblock partition used is the macroblock partition 204 ("YES" in step S110), the process advances to step S111.

In step S111, a small block error extraction unit 8 acquires the matching errors in the middle blocks and motion vector from the middle block motion vector detection unit 7.

Figure 4B:
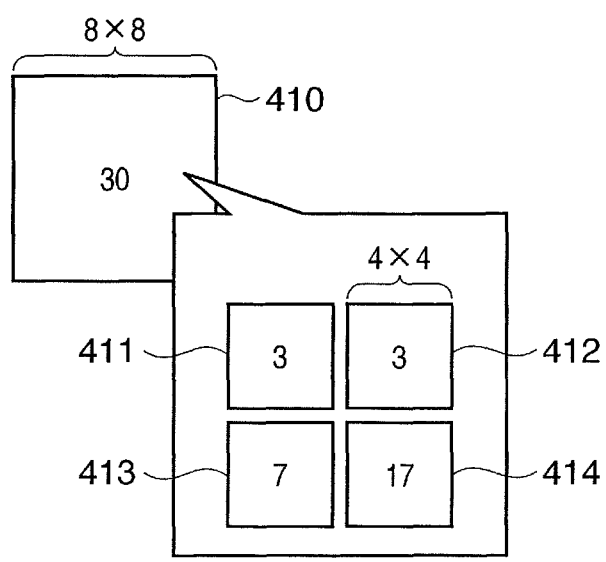
FIG. 4B is a view for explaining the breakdown of matching errors in middle and small blocks according to the first embodiment of the present invention.
Figure 6A:
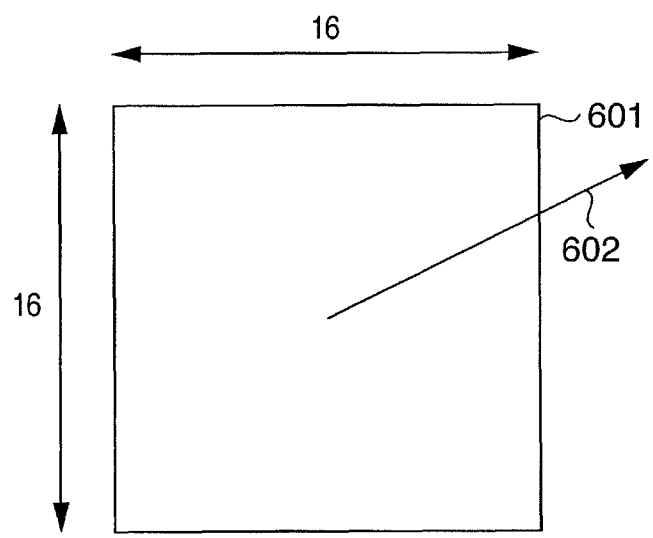
FIGS. 6A and 6B are views showing motion vector assignment.
Figure 6B:
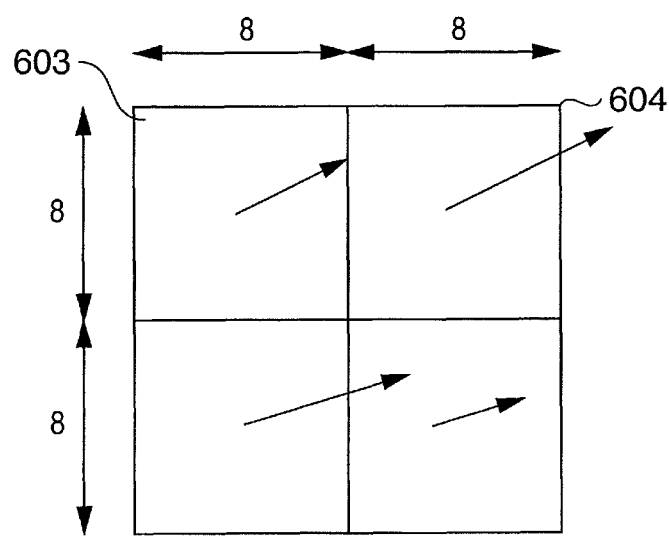
Figure 7A:
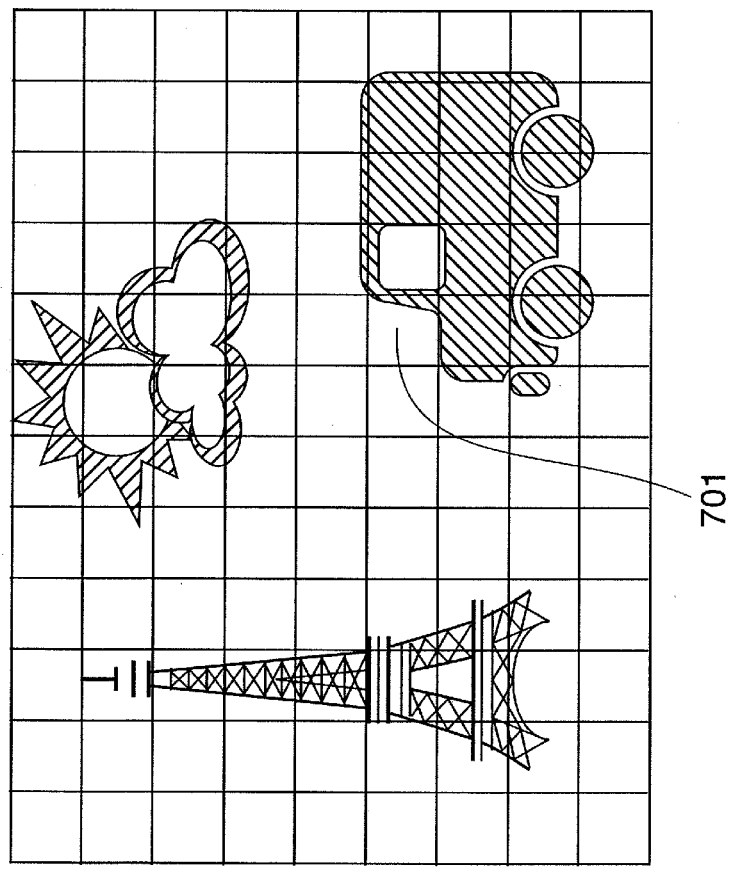
FIGS. 7A and 7B are views showing motion vectors in a macroblock.
Figure 7B:
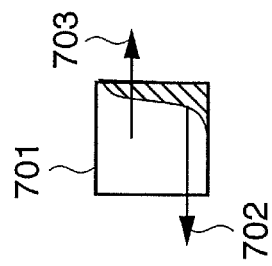

The small block error extraction unit 8 divides a macroblock 410 with a size of 8×8 pixels into sub-macroblocks 411 to 414 each having a size of 4×4 pixels (to be referred to as small blocks hereinafter), as shown in FIG. 4B, and extracts matching errors of respective small blocks. Assume that the matching errors to be extracted are MAElow(0) for the small block 411, MAElow(1) for the small block 412, MAElow(2) for the small block 413, and MAElow(3) for the small block 414. The extracted matching errors are transmitted to a sub-macroblock partition determination unit 9. Note that FIG. 4B shows an example in which when the matching error MAElow of the macroblock 410 is 30, the matching errors of the respective small blocks are MAElow(0)=3, MAElow(1)=3, MAElow(2)=7, and MAElow(3)=17.

Note that the processes after step S111 are executed for each of the macroblocks of 8×8 pixels of the macroblock partition 204. In this way, sub-macroblock partitions are determined for each macroblock, and motion vectors are detected according to the determined sub-macroblock partitions.

In step S112, the sub-macroblock (SMB) partition determination unit 9 compares the matching errors of the respective small blocks in the current search layer with thresholds, and determines a sub-macroblock partition under the following conditions. In this case, one of the sub-macroblock partitions 205 to 208 shown in FIG. 2A is selected. That is, among block sizes of 8×8 pixels, 8×4 pixels, 4×8 pixels, or 4×4 pixels one block size is selected here. Note that thresholds Thll and Thml satisfy Thll<Thml.

(Condition 1')
If MAElow(0)<Thll, MAElow(1)<Thll, MAElow(2)<Thll, and MAElow(3)<Thll,
  the sub-macroblock partition 205 is selected.
(Condition 2')
If MAElow(0)<Thll, MAElow(1)<Thll, MAElow(2)<Thll, and MAElow(3)≥Thll:
  if MAElow(1)+MAElow(3)<Thml and MAElow(2)+MAElow(3)<Thml,
   the sub-macroblock partitions 206 and 207 are selected;
  if MAElow(1)+MAElow(3)<Thml and MAElow(2)+MAElow(3)≥Thml,
   the sub-macroblock partition 207 is selected;
  if MAElow(1)+MAElow(3)≥Thml and MAElow(2)+MAElow(3)<Thml,
   the sub-macroblock partition 206 is selected; or
  if MAElow(1)+MAElow(3)≥Thml and MAElow(2)+MAElow(3)≥Thml,
   the sub-macroblock partition 208 is selected.
(Condition 3')
If MAElow(0)<Thll, MAElow(1)<Thll, MAElow(2)≥Thll, and MAElow(3)<Thll:
  if MAElow(0)+MAElow(2)<Thml and MAElow(2)+MAElow(3)<Thml,
   the sub-macroblock partitions 206 and 207 are selected;
  if MAElow(0)+MAElow(2)<Thml and MAElow(2)+MAElow(3)≥Thml,
   the sub-macroblock partition 207 is selected;
  if MAElow(0)+MAElow(2)≥Thml and MAElow(2)+MAElow(3)<Thml,
   the sub-macroblock partition 206 is selected; or
  if MAElow(0)+MAElow(2)≥Thml and MAElow(2)+MAElow(3)≥Thml,
   the sub-macroblock partition 208 is selected.
(Condition 4')
If MAElow(0)<Thll, MAElow(1)<Thll, MAElow(2)≥Thll, and MAElow(3)≥Thll,
  the sub-macroblock partition 206 is selected.
(Condition 5')
If MAElow(0)<Thll, MAElow(1)≥Thll, MAElow(2)<Thll, and MAElow(3)<Thll:
  if MAElow(1)+MAElow(0)<Thml and MAElow(1)+MAElow(3)<Thml,
   the sub-macroblock partitions 206 and 207 are selected;
  if MAElow(1)+MAElow(0)<Thml and MAElow(1)+MAElow(3)≥Thml,
   the sub-macroblock partition 206 is selected;
  if MAElow(1)+MAElow(0)≥Thml and MAElow(1)+MAElow(3)<Thml,
   the sub-macroblock partition 207 is selected; or
  if MAElow(1)+MAElow(0)≥Thml and MAElow(1)+MAElow(3)≥Thml,
   the sub-macroblock partition 208 is selected.
(Condition 6')
If MAElow(0)<Thll, MAElow(1)≥Thll, MAElow(2)<Thll, and MAElow(3)≥Thll,
  the sub-macroblock partition 207 is selected.
(Condition 7')
If MAElow(0)<Thll, MAElow(1)≥Thll, MAElow(2)≥Thll, and MAElow(3)<Thll:
  if MAElow(1)+MAElow(0)<Thml, MAElow(0)+MAElow(2)<Thml, MAElow(1)+MAElow(3)<Thml, and MAElow(2)+MAElow(3)<Thml,
   the sub-macroblock partitions 206 and 207 are selected;

if MAElow(1)+MAElow(0)<Thml, MAElow(0)+MAElow(2)≥Thml, MAElow(1)+MAElow(3)<Thml, and MAElow(2)+MAElow(3)≥Thml,
  the sub-macroblock partition 206 is selected;
if MAElow(1)+MAElow(0)≥Thml, MAElow(0)+MAElow(2)<Thml, MAElow(1)+MAElow(3)<Thml, and MAElow(2)+MAElow(3)≥Thml,
  the sub-macroblock partition 207 is selected; or otherwise,
  the sub-macroblock partition 208 is selected.
(Condition 8')
If MAElow(0)<Thll, MAElow(1)≥Thll, MAElow(2)≥Thll, and MAElow(3)≥Thll:
  if MAElow(1)+MAElow(0)<Thml, MAElow(0)+MAElow(2)<Thml, MAElow(1)+MAElow(3)<Thml, and MAElow(2)+MAElow(3)<Thml,
    the sub-macroblock partitions 206 and 207 are selected;
  if MAElow(1)+MAElow(0)<Thml, MAElow(0)+MAElow(2)≥Thml, MAElow(1)+MAElow(3)<Thml, and MAElow(2)+MAElow(3)≥Thml,
    the sub-macroblock partition 206 is selected;
  if MAElow(1)+MAElow(0)≥Thml, MAElow(0)+MAElow(2)<Thml, MAElow(1)+MAElow(3)<Thml, and MAElow(2)+MAElow(3)≥Thml,
    the sub-macroblock partition 207 is selected; or otherwise,
    the sub-macroblock partition 208 is selected.
(Condition 9')
If MAElow(0)≥Thll, MAElow(1)<Thll, MAElow(2)<Thll, and MAElow(3)<Thll:
  if MAElow(0)+MAElow(1)<Thml and MAElow(0)+MAElow(2)<Thml,
    the sub-macroblock partitions 206 and 207 are selected;
  if MAElow(0)+MAElow(1)<Thml and MAElow(0)+MAElow(2)≥Thml,
    the sub-macroblock partition 206 is selected;
  if MAElow(0)+MAElow(1)≥Thml and MAElow(0)+MAElow(2)<Thml,
    the sub-macroblock partition 207 is selected; or
  if MAElow(0)+MAElow(1)≥Thml and MAElow(0)+MAElow(2)≥Thml,
    the sub-macroblock partition 208 is selected.
(Condition 10')
If MAElow(0)≥Thll, MAElow(1)<Thll, MAElow(2)<Thll, and MAElow(3)≥Thll:
  if MAElow(1)+MAElow(0)<Thml, MAElow(0)+MAElow(2)<Thml, MAElow(1)+MAElow(3)<Thml, and MAElow(2)+MAElow(3)<Thml,
    the sub-macroblock partitions 206 and 207 are selected;
  if MAElow(1)+MAElow(0)<Thml, MAElow(0)+MAElow(2)≥Thml, MAElow(1)+MAElow(3)<Thml, and MAElow(2)+MAElow(3)≥Thml,
    the sub-macroblock partition 206 is selected;
  if MAElow(1)+MAElow(0)≥Thml, MAElow(0)+MAElow(2)<Thml, MAElow(1)+MAElow(3)<Thml, and MAElow(2)+MAElow(3)≥Thml,
    the sub-macroblock partition 207 is selected; or otherwise,
    the sub-macroblock partition 208 is selected.
(Condition 11')
If MAElow(0)≥Thll, MAElow(1)<Thll, MAElow(2)≥Thll, and MAElow(3)<Thll,
  the sub-macroblock partition 206 is selected.
(Condition 12')
If MAElow(0)≥Thll, MAElow(1)<Thll, MAElow(2)≥Thll, and MAElow(3)≥Thll:
  if MAElow(1)+MAElow(0)<Thml, MAElow(0)+MAElow(2)<Thml, MAElow(1)+MAElow(3)<Thml, and MAElow(2)+MAElow(3)<Thml,
    the sub-macroblock partitions 206 and 207 are selected;
  if MAElow(1)+MAElow(0)<Thml, MAElow(0)+MAElow(2)≥Thml, MAElow(1)+MAElow(3)<Thml, and MAElow(2)+MAElow(3)≥Thml,
    the sub-macroblock partition 206 is selected;
  if MAElow(1)+MAElow(0)≥Thml, MAElow(0)+MAElow(2)<Thml, MAElow(1)+MAElow(3)<Thml, and MAElow(2)+MAElow(3)≥Thml,
    the sub-macroblock partition 207 is selected; or otherwise,
    the sub-macroblock partition 208 is selected.
(Condition 13')
If MAElow(0)≥Thll, MAElow(1)≥Thll, MAElow(2)<Thll, and MAElow(3)<Thll,
  the sub-macroblock partition 206 is selected.
(Condition 14')
If MAElow(0)≥Thll, MAElow(1)≥Thll, MAElow(2)<Thll, and MAElow(3)≥Thll:
  if MAElow(1)+MAElow(0)<Thml, MAElow(0)+MAElow(2)<Thml, MAElow(1)+MAElow(3)<Thml, and MAElow(2)+MAElow(3)<Thml,
    the sub-macroblock partitions 206 and 207 are selected;
  if MAElow(1)+MAElow(0)<Thml, MAElow(0)+MAElow(2)≥Thml, MAElow(1)+MAElow(3)<Thml, and MAElow(2)+MAElow(3)≥Thml,
    the sub-macroblock partition 206 is selected;
  if MAElow(1)+MAElow(0)≥Thml, MAElow(0)+MAElow(2)<Thml, MAElow(1)+MAElow(3)<Thml, and MAElow(2)+MAElow(3)≥Thml,
    the sub-macroblock partition 207 is selected; or otherwise,
    the sub-macroblock partition 208 is selected.
(Condition 15')
If MAElow(0)≥Thll, MAElow(1)≥Thll, MAElow(2)≥Thll, and MAElow(3)<Thll:
  if MAElow(1)+MAElow(0)<Thml, MAElow(0)+MAElow(2)<Thml, MAElow(1)+MAElow(3)<Thml, and MAElow(2)+MAElow(3)<Thml,
    the sub-macroblock partitions 206 and 207 are selected;
  if MAElow(1)+MAElow(0)<Thml, MAElow(0)+MAElow(2)≥Thml, MAElow(1)+MAElow(3)<Thml, and MAElow(2)+MAElow(3)≥Thml,
    the sub-macroblock partition 206 is selected;
  if MAElow(1)+MAElow(0)≥Thml, MAElow(0)+MAElow(2)<Thml, MAElow(1)+MAElow(3)<Thml, and MAElow(2)+MAElow(3)≥Thml,
    the sub-macroblock partition 207 is selected; or otherwise,
    the sub-macroblock partition 208 is selected.
(Condition 16')
If MAElow(0)≥Thll, MAElow(1)≥Thll, MAElow(2)≥Thll, and MAElow(3)≥Thll:
  if MAElow(1)+MAElow(0)<Thml, MAElow(0)+MAElow(2)<Thml, MAElow(1)+MAElow(3)<Thml, and MAElow(2)+MAElow(3)<Thml,
    the sub-macroblock partitions 206 and 207 are selected;
  if MAElow(1)+MAElow(0)<Thml, MAElow(0)+MAElow(2)≥Thml, MAElow(1)+MAElow(3)<Thml, and MAElow(2)+MAElow(3)≥Thml,
    the sub-macroblock partition 206 is selected;
  if MAElow(1)+MAElow(0)≥Thml, MAElow(0)+MAElow(2)<Thml, MAElow(1)+MAElow(3)<Thml, and MAElow(2)+MAElow(3)≥Thml,
    the sub-macroblock partition 207 is selected; or otherwise,
    the sub-macroblock partition 208 is selected.

If, for example, Thll=4 and Thml=10, in the example of FIG. 4B, when the above (Condition 4') is applied the sub-macroblock partition 206 will be selected. Note that if the sub-macroblock partition 205 is selected, the middle block search mode is set to ON. If the sub-macroblock partition other than the sub-macroblock partition 205 is selected, the setting of the middle block search mode is kept OFF, and a small block search mode is set to ON.

In step S113, it is determined whether the small block search mode is ON. If the small block search mode is ON ("YES" in step S113), the process advances to step S114. In this case, for the macroblock of 8×8 pixels, a sub-macroblock partition other than the sub-macroblock partition 205 is selected. On the other hand, if the small block search mode is OFF ("NO" in step S113), the process advances to step S121. In this case, the sub-macroblock partition 205 is selected for the macroblock of 8×8 pixels, and motion vector detection is done for middle blocks of 8×8 pixels.

In step S114, the small block motion vector detection unit 10 acquires information regarding the sub-macroblock partition and the motion vector from the middle block motion vector detection unit 7. The small motion vector detection unit 10 sets a new matching position using that motion vector.

In step S115, the small block motion vector detection unit 10 calculates matching errors MAElow in the search range with reference image data input from the reference image storage unit 4 using the sub-macroblock partition. The matching errors MAElow are calculated for each search layer, and finally, the motion vector which minimizes the matching error MAElow within the search range (all the search layers) along with the corresponding matching error at that time is determined. This motion vector will be referred to as a "final motion vector" hereinafter.

In step S116, it is determined whether the current search layer is the lowermost search layer. If it is determined that the current search layer is the lowermost search layer ("YES" in step S116), the process advances to step S117. In step S117, the final macroblock partition/final motion vector determination unit 11 receives the sub-macroblock partition and final motion vector information at that time from the small block motion vector detection unit 10. On the other hand, if it is determined that the current search layer is not the lowermost search layer ("NO" in step S116), the process advances to step S123 to update the search layer by one, and the process from step S114 continues with the next lowest search layer.

The final macroblock partition/final motion vector determination unit 11 receives the sub-macroblock partition and the final motion vector information in step S117. These of information items are transmitted from one of the large block motion vector detection unit 3, middle block motion vector detection unit 7, and small block motion vector detection unit 10. In step S124, the final macroblock partition/final motion vector determination unit 11 transmits the received information to the inter prediction unit 2013 and entropy encoder 2004 outside the motion detection unit 2014.

In the aforementioned embodiment, a search can be conducted with a search pixel precision of one pixel in both the horizontal and vertical directions for all block sizes. However, the search precision may be varied in accordance with the search layers.

For example, a case will be examined wherein a search is conducted with a search precision of every other pixel in the horizontal direction for upper layers, and with a one-pixel precision in both the horizontal and vertical directions for lower layers.

When the macroblock size upon conducting a search with a one-pixel precision in both the horizontal and vertical directions in upper layers is 16 (horizontal)×16 (vertical) pixels, a macroblock size corresponding to an identical search range with a search precision of every other pixels in the horizontal direction is 8 (horizontal)×16 (vertical) pixels. At this time, blocks are divided to have a size of 4 (horizontal)×8 (vertical) pixels, and can be compared with a threshold. The block size used in lower layers is determined according to the comparison result, and a search can be conducted for the lower layers with a one-pixel precision in both the horizontal and vertical directions.

According to the aforementioned embodiment of the present invention, appropriate macroblock partitions used for a plurality of search layers can be narrowed down from the macroblock type with a large size. In this way, a motion search need not be conducted using all macroblock partitions and sub-macroblock partitions for each of a plurality of reference frames. Hence, the arithmetic load on motion detection can be greatly reduced. As a result, battery power consumption of apparatuses can be reduced, and video camera systems capable of high image quality over long time periods can be realized.

Second Embodiment

Figure 8:
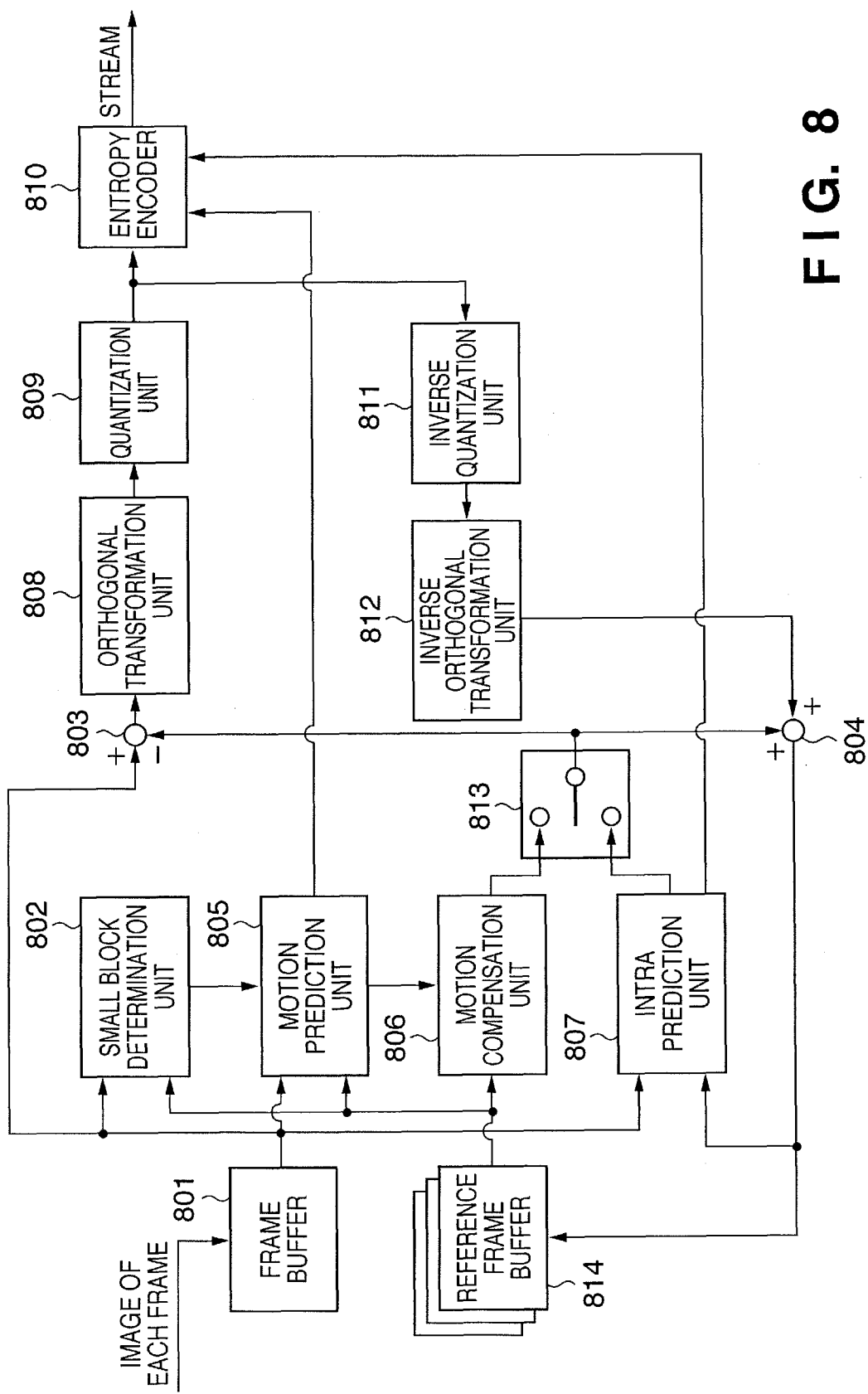
FIG. 8 is a block diagram showing the functional arrangement of an image encoding apparatus according to the second embodiment of the present invention.

FIG. 8 is a block diagram showing the functional arrangement of an image encoding apparatus according to this embodiment. This image encoding apparatus encodes images of respective frames. More specifically, like H.264, this apparatus divides one frame image into a plurality of macroblocks, and encodes each divided macroblock by performing motion prediction on that macroblock. Note that when one macroblock is divided into a plurality of sub-macroblocks (small blocks), motion prediction is performed for respective sub-macroblocks.

As shown in FIG. 8, the image encoding apparatus has a frame buffer 801, small block determination unit 802, motion prediction unit 805, motion compensation unit 806, intra prediction unit 807, orthogonal transformation unit 808, quantization unit 809, entropy encoder 810, and inverse quantization unit 811. Furthermore, the apparatus has an inverse orthogonal transformation unit 812, switch unit 813, reference frame buffers 814, and adders 803 and 804. In this embodiment, the respective units shown in FIG. 8 are implemented in hardware.

The operations of the respective units will be described below.

Images of respective frames which form a moving image to be encoded are sequentially input to and stored in the frame buffer 801.

Each frame image is input to the small block determination unit 802, motion prediction unit 805, and intra prediction unit 807 as macroblocks (16 pixels (horizontal)×16 lines (vertical)).

Upon reception of macroblocks, which form a frame to be encoded, from the reference frame buffer 814, the intra prediction unit 807 generates a predicted image (predicted data) for each macroblock using pixel values of a neighboring, already encoded block in the same space. The intra prediction unit 807 generates the predicted image for the first frame of those which form a moving image. The intra prediction unit 807 outputs the generated predicted image to the adders 803 and 804 via the switch unit 813.

The adder 803 generates, as prediction error data, a difference between a macroblock input from the reference frame buffer 814 and the predicted data for this macroblock, and outputs the prediction error data to the orthogonal transformation unit 808. The operation of the adder 804 will be described later.

The intra prediction unit 807 outputs encoding information such as a pixel pattern and the like used in intra prediction encoding to the entropy encoder 810.

Moreover, the small block determination unit 802 determines a unit of encoding for a macroblock (macroblock P) in the frame to be encoded input from the frame buffer 801. The small block determination unit 802 reads out a macroblock (macroblock Q) positionally corresponding to the macroblock P in an image of a frame before (one or more arbitrary frames before) the frame to be encoded from the reference frame buffer 814. The unit 802 then calculates a difference D between the macroblocks P and Q.

Let Pi (1≤i≤M×N) be a pixel i which forms the macroblock P, and Qj be a pixel j which forms the macroblock Q. Then, the difference D can be calculated by:

$$D = \sum_{i=1}^{(m \times n)} |P_i - Q_j| \quad (1)$$

As can be understood from this equation, a change between the macroblocks P and Q is smaller with decreasing difference D, and is larger with increasing difference D.

Next, the small block determination unit 802 compares the difference D with a threshold th1, which is set in advance. If D<th1, the unit 802 determines that "motion compensation is skipped".

Also, the small block determination unit 802 compares the difference D with the threshold th1 and a threshold th2 larger than the threshold th1. As a result, if th1≤D<th2, the small block determination unit 802 determines "macroblock P" as a unit of encoding for the macroblock P. That is, the unit 802 determines that the macroblock P is not divided into sub-macroblocks, and performs encoding based on motion compensation using a macroblock as a unit of encoding.

The small block determination unit 802 compares the difference D with the threshold th2. As a result, if D≥th2, the small block determination unit 802 determines "unit is smaller than macroblock P" as a unit of encoding for the macroblock P. That is, the unit 802 determines that the macroblock P is divided into sub-macroblocks, and performs encoding based on motion compensation using sub-macroblocks as a unit of encoding.

With this processing of the small block determination unit 802, a unit of encoding for the macroblock to be encoded can be determined in accordance with the difference between the corresponding macroblocks.

The determination result of the small block determination unit 802 is output to the motion prediction unit 805 as determination information. Upon reception of the determination information from the small block determination unit 802, the motion prediction unit 805 acquires the macroblock P from the frame buffer 801 and image data of a plurality of old frames stored in the reference frame buffers 814.

The motion prediction unit 805 switches the processing in accordance with the determination information, as will be described below.

Upon reception of the determination information indicating that "motion compensation is skipped", the motion prediction unit 805 skips any motion search, and outputs encoding information indicating that there is no motion vector to the motion compensation unit 806 and entropy encoder 810.

Upon reception of the determination information indicating that "macroblock P" is determined as a unit of encoding for the macroblock P, the motion prediction unit 805 operates as follows. The motion prediction unit 805 searches a plurality of old frame images stored in the reference frame buffers 14 for a macroblock R similar to the macroblock P. The motion prediction unit 805 detects a motion vector as a spatial displacement amount between the macroblocks P and R. The motion prediction unit 805 then outputs encoding information, which includes the detected motion vector, the unit of encoding (the macroblock P in this case), and the number of the frame (reference frame) from which the macroblock R is extracted, to the motion compensation unit 806 and entropy encoder 810.

Upon reception of the determination information indicating that "sub-macroblock" has been determined as a unit of encoding for the macroblock P, the motion prediction unit 805 operates as follows. The motion prediction unit 805 divides the macroblock P into a plurality of sub-macroblocks. The motion prediction unit 805 executes the following processing for each individual sub-macroblock (sub-macroblock S).

The motion prediction unit 805 searches a plurality of old frame images stored in the reference frame buffers 14 for a sub-macroblock T similar to the sub-macroblock S. The motion prediction unit 805 detects a motion vector as a spatial displacement amount between the sub-macroblocks S and T.

The motion prediction unit 805 repeats such processing for calculating a motion vector for each sub-macroblock for respective sub-macroblocks, which form the macroblock P. The motion prediction unit 805 then outputs encoding information, which includes the motion vectors detected for respective sub-macroblocks, the unit of encoding (sub-macroblock in this case), and the number of the frame (reference frame) from which each sub-macroblock T is extracted, to the motion compensation unit 806 and entropy encoder 810. Note that the processing to be executed for each sub-macroblock is an example, and the present invention is not limited to this.

Also, since the aforementioned motion compensation to be done for each macroblock or that to be done for each sub-macroblock is a state-of-the-art technique, no more explanation will be provided.

Upon reception of the encoding information from the motion prediction unit 805, the motion compensation unit 806 acquires an image of a frame corresponding to each reference frame number included in this encoding information from the reference frame buffer 814. Then, the motion compensation unit 806 generates a predicted image for each macroblock (sub-macroblock) with reference to the acquired image of the frame. The motion compensation unit 806 outputs the predicted image to the switch unit 813. The switch unit 813 sends the predicted image to the adder 803.

The adder 803 calculates, as prediction error data, a difference between each macroblock (sub-macroblock) input from the reference frame buffer 814 and the corresponding predicted image, and outputs the difference to the orthogonal transformation unit 808.

Upon reception of the prediction error data, the orthogonal transformation unit 808 applies a known orthogonal transformation to the prediction error data to generate orthogonal transformation coefficients. The unit 808 outputs the generated orthogonal transformation coefficients to the quantization unit 809.

The quantization unit 809 executes known quantization processing for the input orthogonal transformation coefficients to generate quantized orthogonal transformation coefficients, and outputs them to the entropy encoder 810 and inverse quantization unit 811.

The entropy encoder 810 performs known entropy encoding based on the quantized orthogonal transformation coefficients input from the quantization unit 809 and the encoding information input from the motion prediction unit 805 to multiplex them into a compressed stream, and externally outputs the compressed stream. Since the series of encoding processes performed by the entropy encoder 810 correspond to those followed by H.264, a description thereof will not be given.

Moreover, the inverse quantization unit 811 inverse-quantizes the quantized orthogonal transformation coefficients input from the quantization unit 809 in order to generate orthogonal transformation coefficients, and outputs them to the inverse orthogonal transformation unit 812.

The inverse orthogonal transformation unit 812 applies inverse orthogonal transformation to the orthogonal transformation coefficients input from the inverse quantization unit 811 in order to generate prediction error data, and outputs the prediction error data to the adder 804.

The adder 804 adds the prediction error data input from the inverse orthogonal transformation unit 812 with the predicted image input from the switch unit 813 to generate a frame image. The adder 804 filters this frame image using a loop filter (not shown), and sends it to the reference frame buffer 814. This frame image is stored in the reference frame buffer 814, and is used as a reference frame in the subsequent encoding processing. Also, the adder 804 stores the information associated with the motion vector and reference frame number in the reference frame buffer 814 together with the reference frame image as additional data for the reference frame image.

Figure 9A:
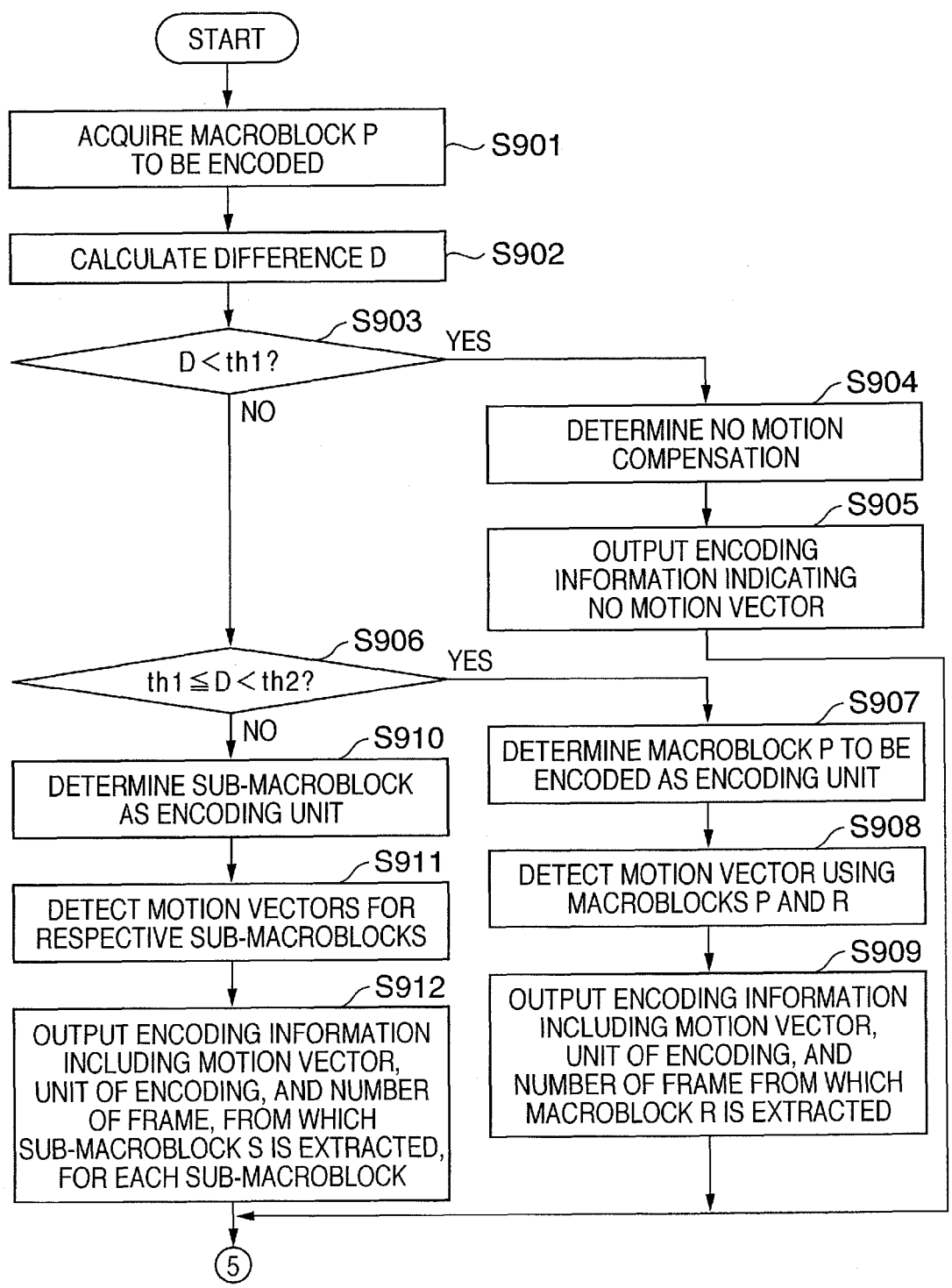
FIGS. 9A and 9B are flowcharts of encoding processing for a macroblock P in a frame to be encoded according to the second embodiment of the present invention.
Figure 9B:
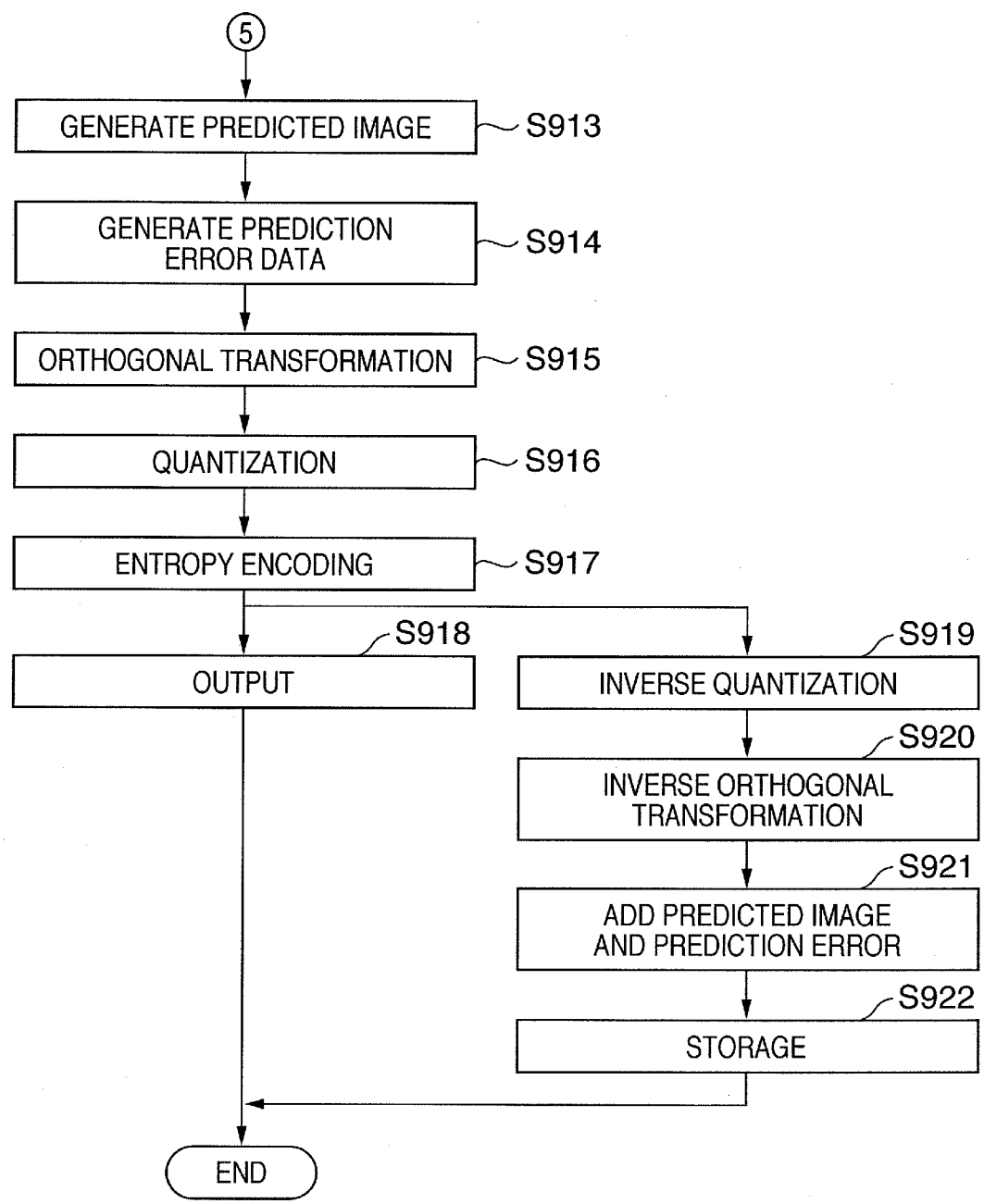

The series of encoding processes described above will be explained below with reference to the flowchart shown in FIGS. 9A and 9B. FIGS. 9A and 9B are flowcharts depicting encoding processing for the macroblock P in the frame to be encoded. Therefore, by applying the processing according to the flowchart of FIGS. 9A and 9B to respective macroblocks which form the frame to be encoded, that frame can be encoded. Of course, by applying the encoding processing for the frame to be encoded to respective frames which form a moving image, the entire moving image can be encoded.

In step S901, the small block determination unit 802 acquires the macroblock P as a macroblock to be encoded in the frame to be encoded from the frame buffer 801.

In step S902, the small block determination unit 802 reads out the macroblock Q from the reference frame buffer 814. The small block determination unit 802 calculates the difference D between the macroblocks P and Q according to equation (1) above.

In step S903, the small block determination unit 802 compares the difference D with the threshold th1, which is set in advance. D and th1 are compared and, if D<th1, the process advances to step S904; if D≥th1, the process advances to step S906.

In step S904, the small block determination unit 802 determines that "motion compensation is skipped", and outputs determination information indicating the determination result to the motion prediction unit 805.

Upon reception of the determination information indicating that "motion compensation is skipped", the motion prediction unit 805 skips any motion search, and outputs encoding information indicating that there is no motion vector to the motion compensation unit 806 and entropy encoder 810 in step S905.

Furthermore, in step S906 the small block determination unit 802 compares the difference D with the threshold th1 and the threshold th2, which is larger than the threshold th1. As a result of comparison, if th1≤D<th2, the process advances to step S907; if D≥th2, the process advances to step S910.

In step S907, the small block determination unit 802 determines "macroblock P" as a unit of encoding for the macroblock P, and outputs determination information indicating that determination result to the motion prediction unit 805.

In step S908, the motion prediction unit 805 searches a plurality of old frame images stored in the reference frame buffers 14 for a macroblock R similar to the macroblock P. The motion prediction unit 805 detects a motion vector as a spatial displacement amount between the macroblocks P and R.

In step S909, the motion prediction unit 805 outputs encoding information, which includes the detected motion vector, the unit of encoding (the macroblock P in this case), and the number of the frame (reference frame) from which the macroblock R is extracted, to the motion compensation unit 806 and entropy encoder 810.

However, in step S910, since D≥th2, the small block determination unit 802 determines "unit smaller than macroblock P" as a unit of encoding for the macroblock P. The unit 802 then outputs determination information indicating that determination result to the motion prediction unit 805.

In step S911, the motion prediction unit 805 divides the macroblock P into a plurality of sub-macroblocks. The unit 805 then executes the following processing for each sub-macroblock (sub-macroblock S).

The motion prediction unit 805 searches a plurality of old frame images stored in the reference frame buffers 14 for a sub-macroblock T similar to the sub-macroblock S. The motion prediction unit 805 detects a motion vector as a spatial displacement amount between the sub-macroblocks S and T. The motion prediction unit 805 repeats such processing for calculating a motion vector for each sub-macroblock for respective sub-macroblocks, which form the macroblock P.

In step S912, the motion prediction unit 805 generates encoding information, which includes the motion vectors detected for respective sub-macroblocks, the unit of encoding (sub-macroblock in this case), and the number of a frame (reference frame) from which each sub-macroblock T is extracted. The unit 805 then outputs the generated encoding information to the motion compensation unit 806 and entropy encoder 810.

After any of steps S905, S909, and S912, the process advances to step S913.

In step S913, the motion compensation unit 806 acquires an image of a frame corresponding to each reference frame number included in this encoding information received from the motion prediction unit 805 from the reference frame buffer 814. Then, the motion compensation unit 806 generates a predicted image for each macroblock (sub-macroblock) with reference to the acquired image of the frame. The motion compensation unit 806 outputs the predicted image to the switch unit 813. The switch unit 813 sends the predicted image to the adder 803.

In step S914, the adder 803 calculates, as prediction error data, a difference between each macroblock P (sub-macroblock S) input from the reference frame buffer 814 and the corresponding predicted image, and outputs the difference to the orthogonal transformation unit 808.

In step S915, the orthogonal transformation unit 808 applies a known orthogonal transformation to the prediction error data to generate orthogonal transformation coefficients. The unit 808 outputs the generated orthogonal transformation coefficients to the quantization unit 809.

In step S916, the quantization unit 809 executes known quantization processing for the input orthogonal transformation coefficients in order to generate quantized orthogonal transformation coefficients, and outputs them to the entropy encoder 810 and inverse quantization unit 811.

In step S917, the entropy encoder 810 performs known entropy encoding based on the quantized orthogonal transformation coefficients input from the quantization unit 809 and the encoding information input from the motion prediction unit 805 to multiplex them into a compressed stream. The entropy encoder 810 externally outputs the compressed stream in step S918.

In step S919, the inverse quantization unit 811 inverse-quantizes the quantized orthogonal transformation coefficients input from the quantization unit 809 to generate orthogonal transformation coefficients, and outputs them to the inverse orthogonal transformation unit 812.

In step S920, the inverse orthogonal transformation unit 812 applies an inverse orthogonal transformation to the orthogonal transformation coefficients input from the inverse quantization unit 811 in order to generate prediction error data, and outputs the prediction error data to the adder 804.

In step S921, the adder 804 adds the prediction error data input from the inverse orthogonal transformation unit 812 and the predicted image input from the switch unit 813 to generate a frame image.

In step S922, the adder 804 filters this frame image using a loop filter (not shown), and stores it in the reference frame buffer 814. Also, the adder 804 stores the information associated with the motion vector and reference frame number in the reference frame buffer 814 together with the reference frame image as additional data for the reference frame image.

As described above, according to this embodiment, prior to selection of a combination of optimal block sizes, a determination is made as to whether or not to apply motion-compensated prediction, and if motion-compensated prediction is to be applied, a unit of encoding can be determined. Therefore, the processing volume can be greatly reduced depending on input images.

For example, in case of image blocks which have nearly no motion such as a background image captured by a camera fixed in position, since the difference between the frame to be encoded and previous frame is very small, motion compensation using small blocks is skipped. Hence, the processing volume can be reduced.

Third Embodiment

Some or all of the units shown in FIG. 1A or 8 may be implemented in software; the remaining units may be implemented in hardware. In this case, for example, this hardware is implemented as a function extension card which can be inserted into a personal computer, and the function extension card is inserted into the personal computer. Also, this software is stored on memory equipped in this personal computer. With this arrangement, a CPU of the personal computer executes this software and performs operation control of the function extension card, thus implementing the same processing as that described in the first or second embodiment (the processing according to the flowchart of FIGS. 3A and 3B or 9A and 9B).

Figure 10:
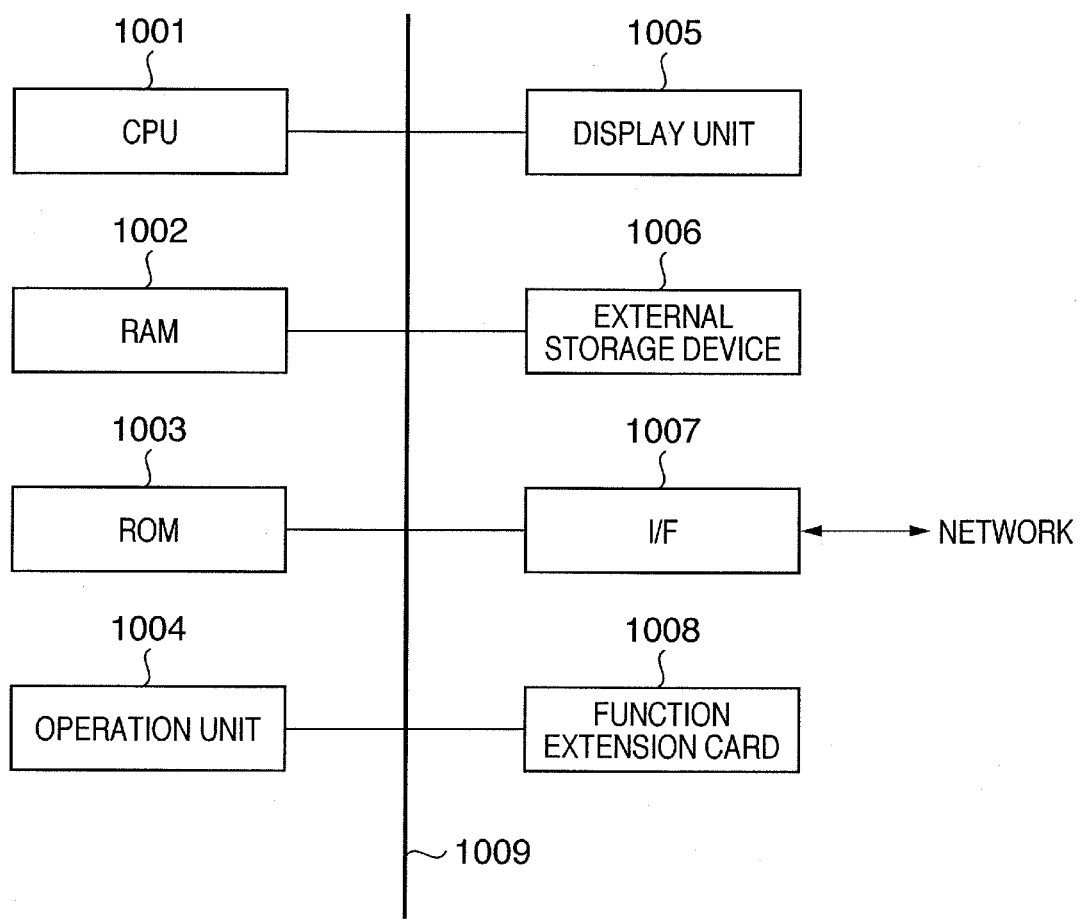
FIG. 10 is a block diagram showing the hardware arrangement of a computer.

FIG. 10 is a block diagram showing the hardware arrangement of this computer.

Reference numeral 1001 denotes a CPU which controls the overall computer using programs and data stored in a RAM 1002 and ROM 1003.

The RAM 1002 has an area for temporarily storing programs and data loaded from an external storage device 1006, and programs and data externally received via an I/F (interface) 1007. Furthermore, the RAM 1002 has a work area used when the CPU 1001 executes various kinds of processing. That is, the RAM 1002 can provide areas for various purposes, as needed.

The ROM 1003 stores setting data, a boot program, and the like of this computer.

Reference numeral 1004 denotes an operation unit, which includes a keyboard, mouse, and the like. When the operator of this computer operates this operation unit 1004, various instructions can be input to the CPU 1001.

Reference numeral 1005 denotes a display unit which comprises a CRT, liquid crystal display, or the like, and can display processing results of the CPU 1001 as images, text, and the like.

The external storage device 1006 is a large-capacity information storage device represented by a hard disk or the like, and stores an OS (operating system), programs, data and the like, making the CPU 1001 execute various types of processing to be implemented by this computer. These programs and data include the aforementioned software, an operation control program of a function extension card 1008, and the like. Also, the external storage device 1006 saves one or more moving image files to be encoded, and programs and data externally received via the I/F 1007.

Under the control of the CPU 1001, various kinds of information saved in the external storage device 1006 are loaded into the RAM 1002 as required. When the CPU 1001 executes processing using the loaded programs and data, this computer can implement the image processing described in the first and second embodiments.

The I/F 1007 connects this computer to a network such as a LAN, the Internet, and the like. For example, when a device for holding moving image files is connected to this network, this computer can acquire a moving image file from this device via the I/F 1007.

The function extension card 1008 is a processing board that executes some or all of the encoding processes based on inter-frame motion compensation for the acquired moving image file.

Reference numeral 1009 denotes a data bus which interconnects the aforementioned units.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An encoding apparatus comprising:
    an imaging unit that generates image data; and
    an encoding unit that (a) performs first motion vector searching using the generated image data and reference image data to detect a motion vector of a first block having a first block size, (b) selects between the first block size and a second block size smaller than the first block size using a result of the first motion vector searching, (c) performs second motion vector searching using the generated image data and the reference image data to detect a motion vector of a second block having the second block size when the second block size is selected, (d) selects between the second block size and a third block size smaller than the second block size using a result of the second motion vector searching, (e) performs third motion vector searching using the generated image data and the reference image data to detect a motion vector of a third block having the third block size when the third block size is selected, (f) generates predicted image data using the motion vector of the first block, the motion vector of the second block, or the motion vector of the third block, and (g) generates encoded data using the generated image data and the predicted image data.

2. The encoding apparatus according to claim 1, wherein the second motion vector searching is more accurate than the first motion vector searching, and the third motion vector searching is more accurate than the second motion vector searching.

3. The encoding apparatus according to claim 1, wherein the first block size includes 16×16 pixels.

4. The encoding apparatus according to claim 1, wherein the second block size includes 16×8 pixels or 8×16 pixels.

5. The encoding apparatus according to claim 1, wherein the third block size includes 8×8 pixels, 8×4 pixels, 4×8 pixels, or 4×4 pixels.

6. A method comprising:
    causing an imaging unit to generate image data;
    causing an encoding unit to perform first motion vector searching using the generated image data and reference image data to detect a motion vector of a first block having a first block size;
    causing the encoding unit to select between the first block size and a second block size smaller than the first block size using a result of the first motion vector searching;
    causing the encoding unit to perform second motion vector searching using the generated image data and the reference image data to detect a motion vector of a second block having the second block size when the second block size is selected;
    causing the encoding unit to select between the second block size and a third block size smaller than the second block size using a result of the second motion vector searching;
    causing the encoding unit to perform third motion vector searching using the generated image data and the reference image data to detect a motion vector of a third block having the third block size when the third block size is selected;
    causing the encoding unit to generate predicted image data using the motion vector of the first block, the motion vector of the second block, or the motion vector of the third block; and
    causing the encoding unit to generate encoded data using the generated image data and the predicted image data.

7. The method according to claim 6, wherein the second motion vector searching is more accurate than the first motion vector searching, and the third motion vector searching is more accurate than the second motion vector searching.

8. The method according to claim 6, wherein the first block size includes 16×16 pixels.

9. The method according to claim 6, wherein the second block size includes 16×8 pixels or 8×16 pixels.

10. The method according to claim 6, wherein the third block size includes 8×8 pixels, 8×4 pixels, 4×8 pixels, or 4×4 pixels.

11. A non-transitory storage medium that stores a program for causing a computer to execute a method comprising:
    causing an imaging unit to generate image data;
    causing an encoding unit to perform first motion vector searching using the generated image data and reference image data to detect a motion vector of a first block having a first block size;
    causing the encoding unit to select between the first block size and a second block size smaller than the first block size using a result of the first motion vector searching;
    causing the encoding unit to perform second motion vector searching using the generated image data and the reference image data to detect a motion vector of a second block having the second block size when the second block size is selected;
    causing the encoding unit to select between the second block size and a third block size smaller than the second block size using a result of the second motion vector searching;
    causing the encoding unit to perform third motion vector searching using the generated image data and the reference image data to detect a motion vector of a third block having the third block size when the third block size is selected;

causing the encoding unit to generate predicted image data using the motion vector of the first block, the motion vector of the second block, or the motion vector of the third block; and causing the encoding unit to generate encoded data using the generated image data and the predicted image data.

12. The non-transitory storage medium according to claim 11, wherein the second motion vector searching is more accurate than the first motion vector searching, and the third motion vector searching is more accurate than the second motion vector searching.

13. The non-transitory storage medium according to claim 11, wherein the first block size includes 16×16 pixels.

14. The non-transitory storage medium according to claim 11, wherein the second block size includes 16×8 pixels or 8×16 pixels.

15. The non-transitory storage medium according to claim 11, wherein the third block size includes 8×8 pixels, 8×4 pixels, 4×8 pixels, or 4×4 pixels.

16. The encoding apparatus according to claim 1, wherein the imaging unit is coupled to the encoding unit.

17. The encoding apparatus according to claim 1, wherein the imaging unit includes a camera unit.

18. The encoding apparatus according to claim 1, wherein the encoding unit uses entropy encoding to generate the encoded data.

19. The method according to claim 6, wherein the imaging unit is coupled to the encoding unit.

20. The method according to claim 6, wherein the imaging unit includes a camera unit.

21. The method according to claim 6, wherein the encoding unit uses entropy encoding to generate the encoded data.

* * * * *